US011824676B2

(12) United States Patent
Ando et al.

(10) Patent No.: US 11,824,676 B2
(45) Date of Patent: Nov. 21, 2023

(54) APPARATUS, METHOD, AND PROGRAM FOR HOME DEVICE MANAGEMENT

(71) Applicant: Nippon Telegraph and Telephone Corporation, Tokyo (JP)

(72) Inventors: Dai Ando, Musashino (JP); Yoshiki Nishikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/008,382

(22) PCT Filed: Jun. 16, 2020

(86) PCT No.: PCT/JP2020/023570
§ 371 (c)(1),
(2) Date: Dec. 5, 2022

(87) PCT Pub. No.: WO2021/255826
PCT Pub. Date: Dec. 23, 2021

(65) Prior Publication Data
US 2023/0291599 A1    Sep. 14, 2023

(51) Int. Cl.
*H04L 12/28*       (2006.01)
*H04L 12/24*       (2006.01)
*H04L 41/085*      (2022.01)

(52) U.S. Cl.
CPC ...... *H04L 12/2812* (2013.01); *H04L 12/2836* (2013.01); *H04L 41/085* (2013.01)

(58) Field of Classification Search
CPC ... H04L 41/08; H04L 41/085; H04L 41/0866; H04L 12/2812; H04L 12/2836; H04W 88/182
See application file for complete search history.

(56) References Cited

U.S. PATENT DOCUMENTS

| | | | |
|---|---|---|---|
| 9,294,575 B1* | 3/2016 | Cronin | H04L 12/2812 |
| 2021/0081632 A1* | 3/2021 | Batchu | H04W 4/80 |

FOREIGN PATENT DOCUMENTS

| | | |
|---|---|---|
| JP | 2013207705 | 10/2013 |
| JP | 2016139190 | 8/2016 |

(Continued)

OTHER PUBLICATIONS

Echonet Consortium, "ECHONET Lite Web API Guidelines Version 1.00," echonet.jp, Oct. 3, 2018, retrieved from URL <https://echonet.jp/wp/wp-content/uploads/pdf/General/Download/web_API/ECHONET_Lite_Web_API_guideline_v1.00.pdf>, 95 pages (with English Translation).

(Continued)

*Primary Examiner* — Boris D Grijalva Lobos
(74) *Attorney, Agent, or Firm* — Fish & Richardson P.C.

(57) ABSTRACT

A home equipment management apparatus includes: an inquiry unit that inquires, in response to a registration request from a user terminal via a wide area network, a house control device that controls a standard-compatible equipment and a vendor-specific equipment connected to a home network about information of the vendor-specific equipment via the wide area network; a registration unit that registers the information of the vendor-specific equipment including at least address information transmitted from the house control device, together with identification information indicating that the equipment is a vendor-specific equipment; a confirmation unit that transmits the information of the vendor-specific equipment registered in the equipment management table to the user terminal and acquires a result of approval, correction, or addition by the user terminal; and an update unit that updates a registered content of the vendor-specific equipment according to the result of approval, correction, or addition by the user terminal.

13 Claims, 17 Drawing Sheets

(56) References Cited

FOREIGN PATENT DOCUMENTS

| JP | 2017108471 | 6/2017 |
| JP | 2018032917 | 3/2018 |

OTHER PUBLICATIONS

Echonet Consortium, "Part 1 Overview of ECHONET Lite," ECHONET Lite Specification Ver. 1.13, Jul. 6, 2018, retrieved from URL <https://echonet.jp/wp/wp-content/uploads/pdf/General/Standard/ECHONET_lite_V1_13_jp/ECHONET-Lite_Ver.1.13_01.pdf>, 47 pages (with English Translation).

* cited by examiner

Fig. 2

| MODEL NAME | EQUIPMENT NAME | IDENTIFICATION NUMBER | IP ADDRESS VALUE | COMMON/ EXTENSION FLAG | MAC ADDRESS | VENDOR NAME |
|---|---|---|---|---|---|---|
| | | | | | | |
| | | | | | | |
| | | | | | | |

| MODEL NAME (COMMON API) | MODEL CODE (STANDARD) | MODEL CODE (COMPANY A) | PARAMETER NAME (COMMON API) | PARAMETER CODE (STANDARD) | PARAMETER CODE (COMPANY A) |
|---|---|---|---|---|---|
| homeAirConditioner | 0x01 | 0xA1 | operationStatus | 0x80 | 0x11 |
| homeAirConditioner | 0x01 | 0xA1 | airFlowLevel | 0xA0 | 0x12 |
| homeAirConditioner | 0x01 | 0xA1 | operationMode | 0xB0 | 0x13 |
| homeAirConditioner | 0x01 | 0xA1 | targetTempreature | 0xB3 | 0x14 |

| MODEL NAME | EQUIPMENT NAME | IDENTIFICATION NUMBER | IP ADDRESS VALUE | COMMON/ EXTENSION FLAG | MAC ADDRESS | VENDOR NAME |
|---|---|---|---|---|---|---|
| homeAirConditioner | AIR CONDITIONER 1 | FEXXXX11000000000 0000000000000011 | 192.168.0.11 | 0 | XX-XX-11-00-00-00-11 | N/A |
| homeAirConditioner | AIR CONDITIONER 2 | FEXXXX22000000000 0000000000000012 | 192.168.0.12 | 0 | XX-XX-22-00-00-00-12 | N/A |
|  |  |  |  |  |  |  |
|  |  |  |  |  |  |  |

| MODEL NAME | EQUIPMENT NAME | IDENTIFICATION NUMBER | IP ADDRESS VALUE | COMMON/ EXTENSION FLAG | MAC ADDRESS | VENDOR NAME |
|---|---|---|---|---|---|---|
| homeAirConditioner | AIR CONDITIONER 1 | FEXXXX11000000000 00000000000000011 | 192.168.0.11 | 0 | XX-XX-11-00-00-00-11 | N/A |
| homeAirConditioner | AIR CONDITIONER 2 | FEXXXX22000000000 00000000000000012 | 192.168.0.12 | 0 | XX-XX-22-00-00-00-12 | N/A |
| homeAirConditioner | AIR CONDITIONER 3 | FEAAAAAA000000000 00000000000000013 | 192.168.0.13 | 1 | AA-AA-AA-00-00-00-13 | A |
| | | | | | | |

133

APPARATUS, METHOD, AND PROGRAM FOR HOME DEVICE MANAGEMENT

CROSS-REFERENCE TO RELATED APPLICATIONS

This application is a National Stage application under 35 U.S.C. § 371 of International Application No. PCT/JP2020/023570, having an International Filing Date of Jun. 16, 2020.

The disclosure of the prior application is considered part of the disclosure of this application, and is incorporated by reference in its entirety into this application.

TECHNICAL FIELD

Embodiments of the present disclosure relate to a home equipment management apparatus, method, and program.

BACKGROUND ART

In recent years, systems/services called "Machine to Machine (M2M)/Internet of Things (IoT)" have been studied with the development of the Internet and sensor equipment. In particular, systems for managing home appliances, called "Home Energy Management System (HEMS)", used in a home are increasingly standardized. In addition, a common application programming interface (Web API) for supporting creation of application software (hereinafter, abbreviated as an application) for accessing home appliances in the home from the cloud is also being developed.

ECHONET Lite standard (see NPL 1) by the ECHONET Consortium is known as a representative standard of the HEMS, and a management apparatus can commonly manage even equipment of different vendors, as long as the equipment is compatible with the ECHONET Lite standard.

In addition, the ECHONET Lite standard enables a home equipment to be referred to and controlled from the outside as IoT equipment instead of use as HEMS, and thus also creates a Web API (see NPL 2) as a common API for a cloud application. When an application conforming to this API is created, ECHONET Lite compatible equipment can access equipment of different vendors by the same application.

CITATION LIST

Non Patent Literature

NPL 1: ECHONET Lite Specification Ver. 1.13, Part 1, Overview of ECHONET Lite (https://echonet.jp/wp/wp-content/uploads/pdf/General/Standard/ECHONET_lite_V1_13_jp/ECHONET-Lite_Ver.1.13_01.pdf)

NPL 2: ECHONET Lite Web API Guidelines (https://echonet.jp/wp/wp-content/uploads/pdf/General/Download/web_API/ECHONET_Lite_Web_API_guideline_v1.00.pdf)

SUMMARY OF THE INVENTION

Technical Problem

However, vendor-specific equipment that is not compatible with the ECHONET Lite standard needs to be referred to and controlled using a specific API and a vendor-specific application, that is, a dedicated application. For this reason, applications using the common API described above cannot access the vendor-specific equipment.

The present disclosure has been made in view of the above circumstances, and an object of the present disclosure is to provide a technique that enables access from a common API-compatible application to a vendor-specific equipment.

Means for Solving the Problem

In order to achieve the above object, a home equipment management apparatus according to an aspect of the present disclosure is a home equipment management apparatus connected to a user terminal and a house control device of a user home corresponding to the user terminal via a wide area network, the home equipment management apparatus including: an equipment management table in which address information in a home network and equipment information specifying standard-compatible equipment including a vendor name are registered for the standard-compatible equipment connected to the home network of the user home; an inquiry unit configured to inquire, in response to a registration request from the user terminal, the house control device configured to control the standard-compatible equipment and a vendor-specific equipment connected to the home network about information of the vendor-specific equipment; a registration unit configured to register, in the equipment management table, the information of the vendor-specific equipment including at least address information of the vendor-specific equipment transmitted from the house control device in response to the inquiry from the inquiry unit, together with identification information indicating that the equipment is vendor-specific equipment; a confirmation unit that transmits the information of the vendor-specific equipment registered in the equipment management table by the registration unit to the user terminal and acquires a result of approval, correction, or addition by the user terminal; and an update unit configured to update a registered content of the vendor-specific equipment in the equipment management table according to the result of approval, correction, or addition by the user terminal acquired by the confirmation unit.

Effects of the Invention

According to an aspect of the present disclosure, it is possible to provide the technique that enables access from a common API-compatible application to vendor-specific equipment.

BRIEF DESCRIPTION OF DRAWINGS

FIG. 2 is an exemplary table of an equipment management table.

FIG. 3 is an exemplary table of a protocol conversion table for a company A.

FIG. 7 is an exemplary table of the equipment management table after equipment registration.

FIG. 10 is an exemplary table of the equipment management table after equipment registration.

DESCRIPTION OF EMBODIMENTS

Hereinafter, embodiments of the present disclosure will be described with reference to the drawings.

First Embodiment

Configuration

Figure 1:
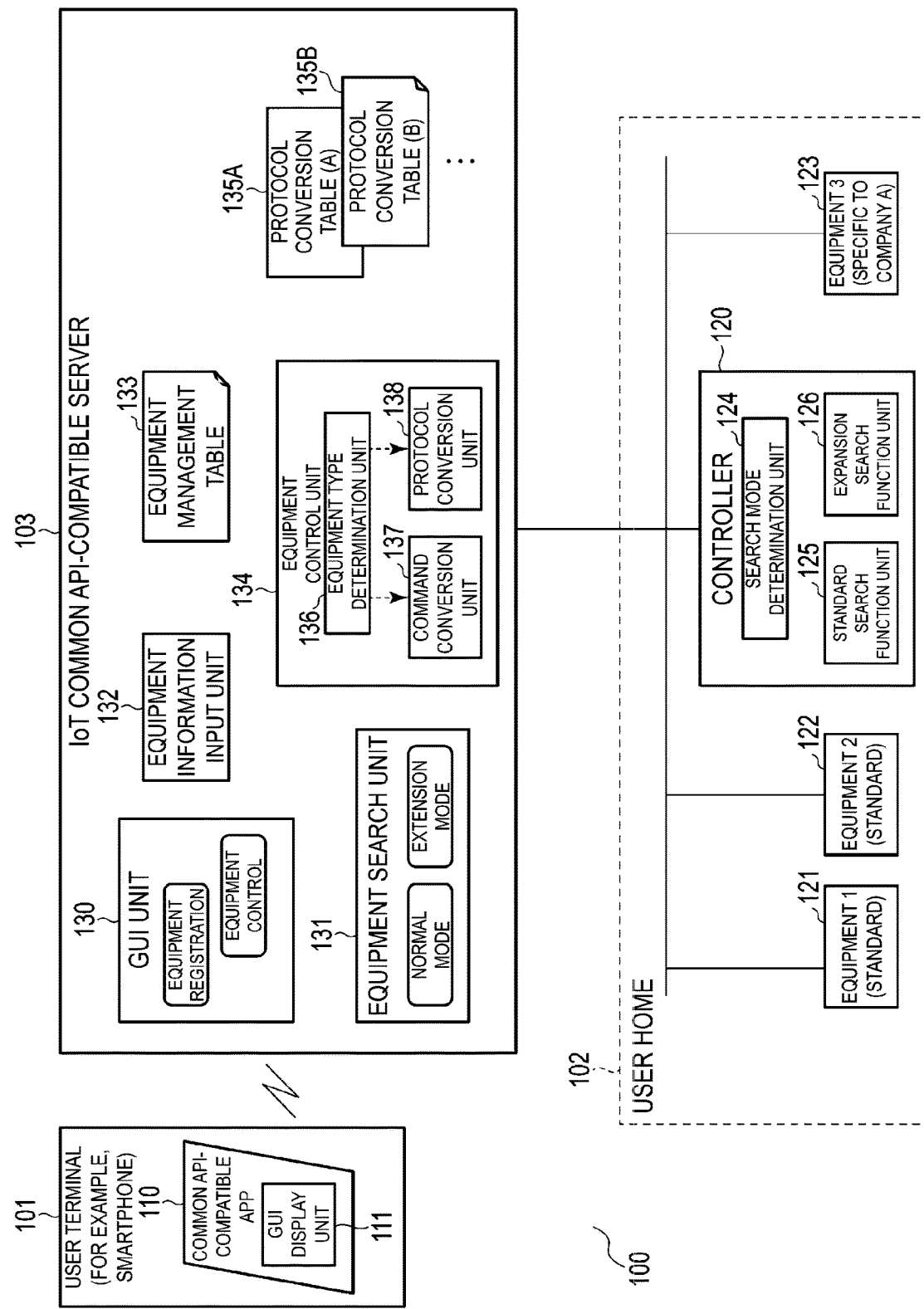
FIG. 1 is a diagram illustrating an overall configuration of a home equipment management system according to a first embodiment of the present disclosure.

FIG. 1 is a diagram illustrating an overall configuration of a home equipment management system 100 according to a first embodiment of the present disclosure. The home equipment management system illustrated in FIG. 1 includes a user terminal 101, a user home 102, and an IoT common API-compatible server 103 serving as a home emergency management apparatus according to the first embodiment. The user terminal 101, the user home 102, and the IoT common API-compatible server 103 are connectable to each other via a wide area network such as the Internet. The IoT common API-compatible server 103 is configured in the cloud, and the user terminal 101 can communicate with equipment in the user home 102 via the IoT common API-compatible server 103. In FIG. 1, only one set of the user terminal 101 and the user home 102 is illustrated, but a plurality of sets can be included. It is obvious that a plurality of user terminals 101 can be combined with one user home 102. The user home 102 is not necessarily a house of the user and may be a facility used by the user, such as an office or a workplace.

The user terminal 101 may be any mobile device such as a smartphone, a wearable terminal, or a tablet. In the user terminal 101, a common API-compatible application (in the drawings, described as "common API-compatible app") 110 is operated.

The common API-compatible application 110 can display a "equipment registration" button and an "equipment control" button on a GUI display unit 111 provided in the user terminal 101. The GUI display unit 111 includes, for example, a touch panel in which a display device and a position input device are combined, and the user can select whether to register or control the equipment in the user home 102 by touching the position of the displayed "equipment registration" button or "equipment control" button.

When the user selects equipment registration, the common API-compatible application 110 can further display a mode selection button on the GUI display unit 111 to allow the user to select whether to perform equipment registration in the normal mode or the extension mode.

In addition, in a case where the user selects the equipment control, the common API-compatible application 110 can display a list of equipment to be controlled on the GUI display unit 111 to allow the user to select equipment to be controlled. The common API-compatible application 110 further displays control items on the GUI display unit 111 to cause the user to instruct how to control the selected equipment. In a case where the equipment to be controlled is an air conditioner, the control items are, for example, temperature, air volume, and wind direction. The common API-compatible application 110 transmits the instruction selected by the user to the IoT common API-compatible server 103 in the cloud by a wireless communication unit included in the user terminal 101.

The user home 102 includes a controller 120, equipment 121, equipment 122, and equipment 123, which are connected to each other via a home network. The controller 120 is a house control device that controls the equipment 121 to the equipment 123 via a home network. The equipment 121 and the equipment 122 are standard-compatible equipment, and in FIG. 1, the equipment 121 is illustrated as equipment 1 (standard), and the equipment 122 is illustrated as equipment 2 (standard). The equipment 123 is vendor-specific equipment, for example, company-A-specific equipment, and is illustrated as equipment 3 (specific to company A) in FIG. 1. The equipment in the user home 102 and the controller 120 can communicate with the IoT common API-compatible server 103 on the cloud via such as a gateway or a router that connects between the home network and an external wide area network (not illustrated in FIG. 1).

The IoT common API-compatible server 103 includes a GUI unit 130, an equipment search unit 131, an equipment information input unit 132, an equipment management table 133, and an equipment control unit 134.

The GUI unit 130 can receive an instruction from the user terminal 101, determine whether the instruction is equipment registration or equipment control, and further determine whether equipment registration is performed in the normal mode or the extension mode according to the instruction further received at the time of receiving the equipment registration instruction. The GUI unit 130 transmits an equipment registration request to the equipment search unit 131 when the instruction is equipment registration and transmits a request message compatible with the common API to the equipment control unit 134 when the instruction is equipment control. The GUI unit 130 can also transmit information from the user terminal 101 to the equipment information input unit 132.

The equipment search unit 131 operates in the normal mode or the extension mode according to whether equipment registration is performed in the normal mode or the extension mode. When operating in the normal mode, the equipment search unit 131 transmits an equipment inquiry request (normal) to the controller 120 in the user home 102 via the cloud. When operating in the extension mode, the equipment search unit 131 transmits an equipment inquiry request (extension) to the controller 120 in the user home 102 via the cloud.

The equipment information input unit 132 can receive, for example, equipment information, a MAC address value, and an IP address value of each equipment in the user home 102 from the controller 120 in the user home 102. The equipment information input unit 132 inputs the received information on each equipment or the information from the user terminal 101 received by the GUI unit 130 to the equipment management table 133.

The equipment management table 133 is stored in a non-volatile memory which can be read and written at any time, such as a flash memory, corresponding to each user home 102 managed by the IoT common API-compatible server 103. As illustrated in FIG. 2, the equipment management table 133 stores a model name, an equipment name, an identification number, an IP address value, a common/extension flag, a MAC address value, and a vendor name for each equipment in the user home 102. FIG. 2 illustrates a case where no equipment is stored, that is, a case where all values are blank. The common/extension flag is a flag value for determining whether the registered equipment is a standard-compatible equipment or a vendor-specific equipment, and has one bit.

The equipment control unit 134 performs control for controlling the equipment 121 to the equipment 123 in the user home 102. The equipment control unit 134 includes a plurality of protocol conversion tables 135A, 135B, and so forth, an equipment type determination unit 136, a command conversion unit 137, and a protocol conversion unit 138.

The protocol conversion tables 135A, 135B, and so forth are stored in a non-volatile memory such as a flash memory that can be read and written at any time. The protocol conversion table can be created one by one for each vendor that is a conversion target. The protocol conversion table is created in advance by a management source or an operation source of the IoT common API-compatible server 103, using information that is publicly available or information acquired by making a technical contract with a corresponding vendor, and the protocol conversion table is installed in the IoT common API-compatible server 103. FIG. 3 is an example of a protocol conversion table (protocol conversion table (A)) 135A for a company A and stores a model name, a model code (standard), a model code (company A), a parameter name (common API), a parameter code (standard), and a parameter code (company A). Although only the protocol conversion table 135A for the company A is illustrated in FIG. 3, it is assumed that a protocol conversion table for the company B as illustrated in FIG. 1 and a protocol conversion table for any other vendor also exist.

The equipment type determination unit 136 refers to the equipment management table 133 to determine whether the equipment control target is a standard-compatible equipment or a vendor-specific equipment.

The command conversion unit 137 converts the request message compatible with the common API into a standard-compatible command when the equipment control target is a standard-compatible equipment.

The protocol conversion unit 138 converts the request message compatible with the common API into a vendor-specific command when the equipment control target is a vendor-specific equipment. For example, when the request message compatible with the common API is a message for controlling equipment of the company A, the protocol conversion unit 138 refers to the protocol conversion table (A) 135A for the company A to convert the request message compatible with the common API for the company-A-specific equipment into a company-A-specific command.

Although not particularly illustrated, the IoT common API-compatible server 103 stores, in a form of, for example, a user database in advance, such as the user information including the correspondence between the user terminal 101 and the user home 102, and the address information necessary for communicating with the user terminal 101 and the controller 120 in the user home 102.

Figure 4:
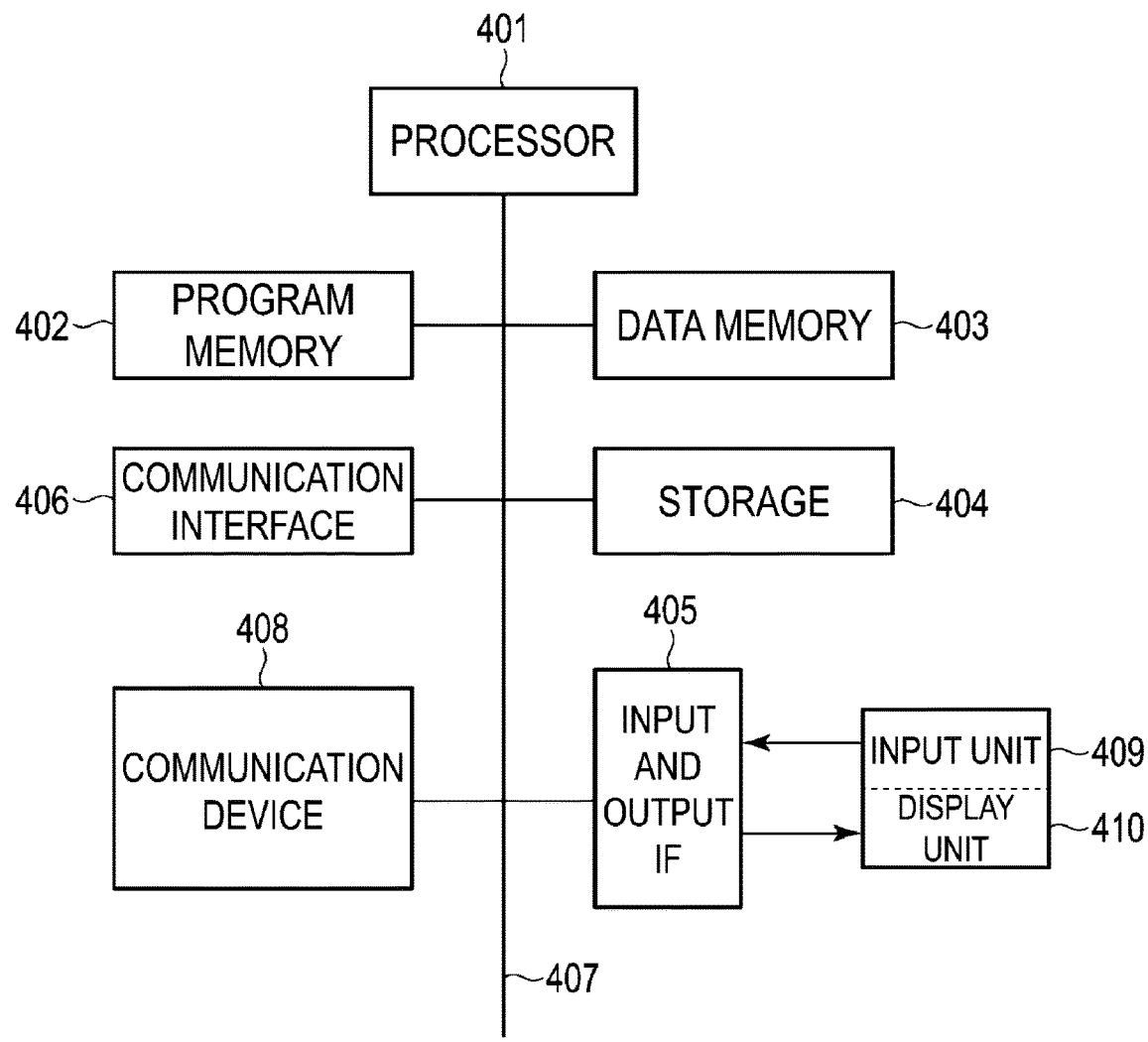
FIG. 4 is a schematic diagram illustrating an example of a computer configuration of an IoT common API-compatible server.

FIG. 4 is a schematic diagram illustrating an example of a computer configuration that can correspond to the user terminal 101, the IoT common API-compatible server 103, or the controller 120.

As illustrated in FIG. 4, the user terminal 101, the IoT common API-compatible server 103, or the controller 120 includes a computer device and includes a processor 401 such as a CPU. In the IoT common API-compatible server 103 and the controller 120, a program memory 402, a data memory 403, a storage 404, an input/output interface (referred to as an input/output IF in FIG. 4) 405, and a communication interface 406 are connected to the processor 401 via a bus 407. Furthermore, in the user terminal 101, a communication device 408 is further connected to the processor 401.

The program memory 402 is a non-transitory tangible computer readable storage medium in which, for example, a non-volatile memory which can be read and written at any time, such as a flash memory, and a non-volatile memory such as a read only memory (ROM) are used in combination. The program memory 402 stores programs necessary for the processor 401 to execute various control processing.

The data memory 403 is a tangible computer readable storage medium in which, for example, the nonvolatile memory and a volatile memory such as a random access memory (RAM) are used in combination. The data memory 403 is used to store various data acquired and created in the process of performing various processes.

The storage 404 includes, as a non-transitory tangible computer readable storage medium, a large-capacity storage medium using a non-volatile memory which can be read and written at any time and reading as needed, such as a hard disk drive (HDD) or a solid state drive (SSD). The storage 404 stores various programs and data necessary for the processor 401 to execute various control processing. For example, the storage 404 stores a control program necessary for the processor 401 to execute control processing as the user terminal 101, the IoT common API-compatible server 103, or the controller 120 according to the first embodiment. The program stored in the storage 404 is read and executed on the data memory 403 by the processor 401 as necessary. In addition, the storage 404 of the IoT common API-compatible server 103 stores the equipment management table 133 and the protocol conversion tables 135A, 135B, and so forth.

The control program in the user terminal 101 can cause, for example, the processor 401 of the user terminal 101 to function as the common API-compatible application 110. The control program in the IoT common API-compatible server 103 can cause the processor 401 of the IoT common API-compatible server 103 to function as the GUI unit 130, the equipment search unit 131, the equipment information input unit 132, and the equipment control unit 134. In addition, the control program in the controller 120 can cause the processor 401 of the controller 120 to function as a search mode determination unit 124, a standard search function unit 125, and an expansion search function unit 126. The management program may be stored in the program memory 402 instead of the storage 404.

An input unit 409 and a display unit 410 are connected to the input/output interface 405. As the input unit 409 and the display unit 410, a touch panel can be used like the GUI display unit 111 of the user terminal 101. Each of the input unit 409 and the display unit 410 may be included in an independent device.

In the user terminal 101, the communication interface 406 is an interface applying a low-power wireless data communication standard such as Bluetooth (trade name). The communication interface 406 can include, in the controller 120, a wireless or wired communication module for connecting to a home network. The communication interface 406 may include, in the IoT common API-compatible server 103, a wireless or wired communication module for connecting to a wide area network.

The communication device 408 in the user terminal 101 is a wireless communication device for connecting to a wireless access network for accessing a wide area network. The wireless access network includes, for example, a mobile phone network operating under a standard such as 3G, 4G, or 5G, a wireless local area network (LAN), or the like.

Operation

1. Equipment Registration

If the equipment information is not registered in the IoT common API-compatible server 103 and the common API-compatible application 110, the user cannot control the equipment by the common API-compatible application 110. So, the user needs to first perform equipment registration.

1-1. Normal Mode

Figure 5:
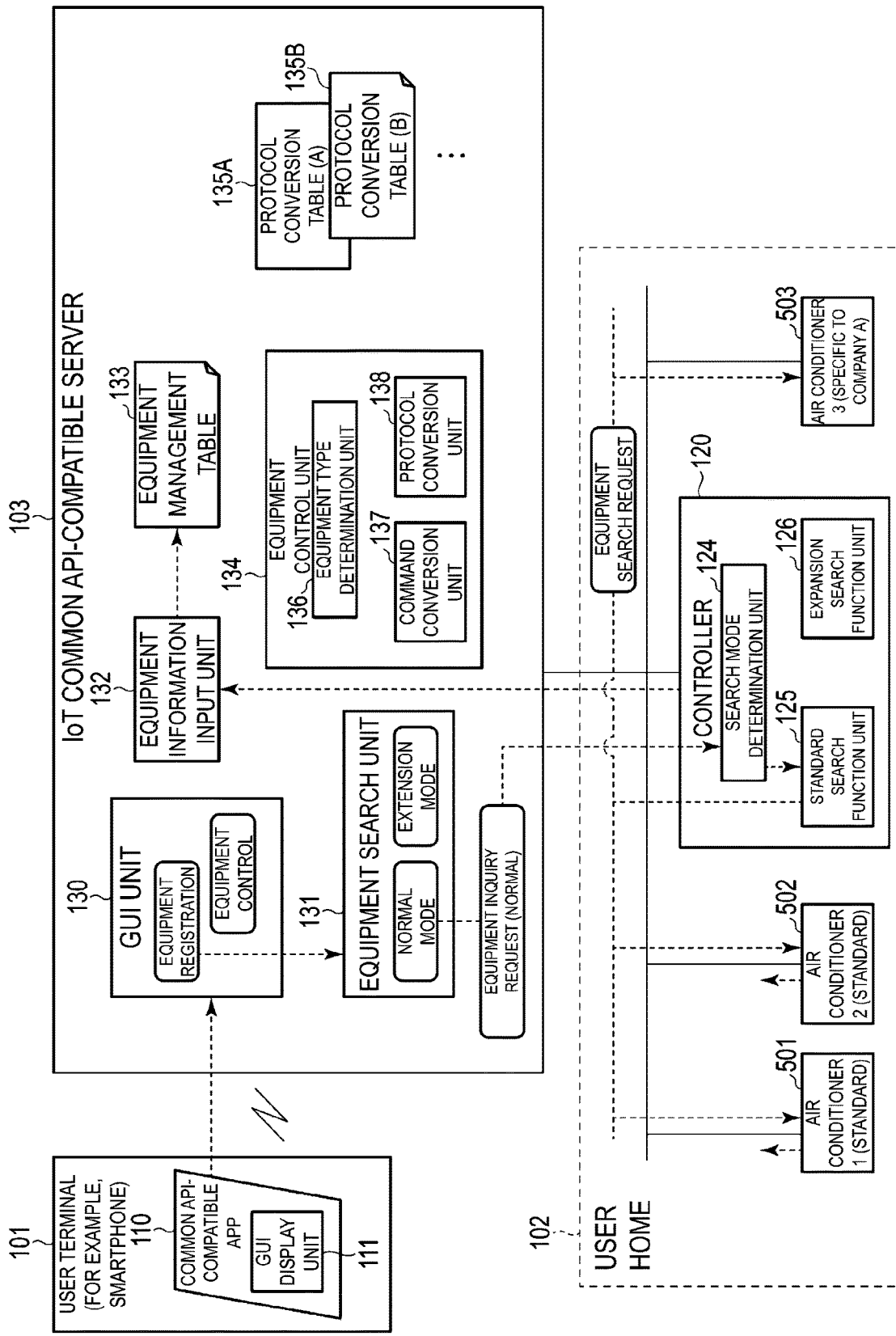
FIG. 5 is a diagram illustrating a flow of data between respective units of the home equipment management system in a case where equipment registration is performed in a normal mode.
Figure 6:
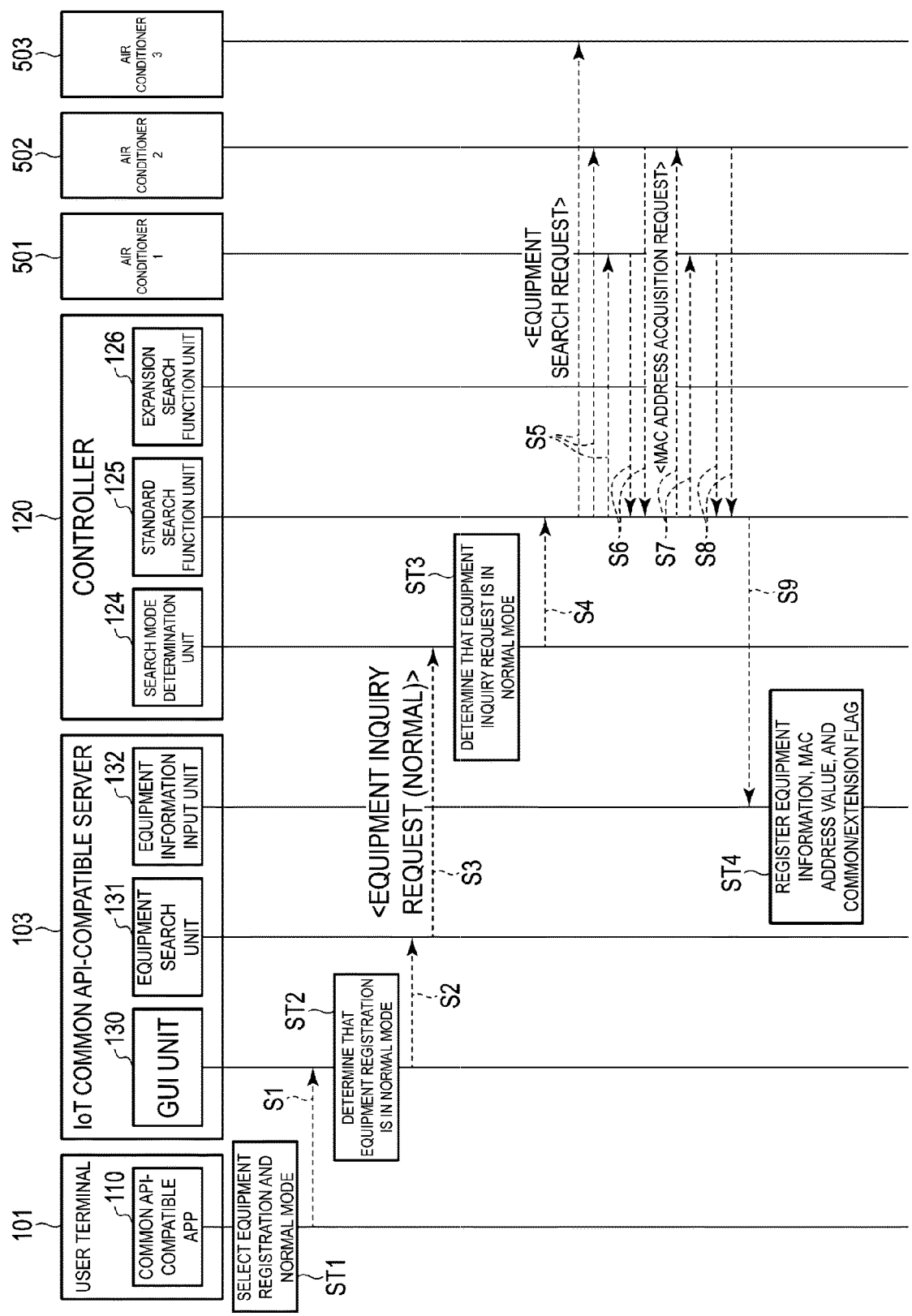
FIG. 6 is a sequence diagram illustrating data communication between respective units when equipment registration is performed in the normal mode.

FIG. 5 is a diagram illustrating a flow of data between respective units of the home equipment management system in a case where equipment registration is performed in a normal mode. FIG. 6 is a sequence diagram illustrating data communication between respective units when equipment registration is performed in the normal mode. In these drawings, it is assumed that the equipment 121 to the equipment 123 installed in the user home 102 are air conditioners 501 to 503. That is, it is assumed that the equipment 121 (equipment 1 (standard)) and the equipment 122 (equipment 2 (standard)) which are compatible with the standard are the air conditioner 501 (illustrated as the air conditioner 1 (standard) in FIG. 5, and illustrated as the air conditioner 1 in FIG. 6) and the air conditioner 502 (illustrated as the air conditioner 2 (standard) in FIG. 5, and illustrated as the air conditioner 2 in FIG. 6) which are compatible with the standard. It is assumed that the company-A-specific equipment 123 (equipment 3 (specific to company A)) is the company-A-specific air conditioner 503 (illustrated as the air conditioner 3 (specific to company A) in FIG. 5, and illustrated as the air conditioner 3 in FIG. 6).

First, in the common API-compatible application 110 of the user terminal 101, the user selects equipment registration through the GUI display unit 111, and further selects the normal mode (ST1).

In response to this, the common API-compatible application 110 of the user terminal 101 transmits an equipment registration request (normal) indicating that equipment registration is performed in the normal mode to the IoT common API-compatible server 103 (51).

The IoT common API-compatible server 103 that has received the equipment registration request (normal) determines that the equipment registration is performed in the normal mode on the basis of the received equipment registration request (normal) in the GUI unit 130 (ST2). The GUI unit 130 transmits an instruction for the equipment search unit 131 to operate in the normal mode to the equipment search unit 131 (S2).

Upon receiving the instruction, the equipment search unit 131 operates in the normal mode, and transmits an equipment inquiry request (normal) to the controller 120 at the user home 102 corresponding to the user of the user terminal 101 (S3).

Upon receiving the equipment inquiry request (normal), the controller 120 determines in the search mode determination unit 124 that the received equipment inquiry request (normal) is in the normal mode (ST3). The search mode determination unit 124 transmits an instruction to issue a standard-compatible equipment search request command to the standard search function unit 125 (S4).

Upon receiving the instruction, the standard search function unit 125 transmits a standard-compatible equipment search request command to all the air conditioners 501 to 503 via the home network (S5).

The air conditioner 501 and the air conditioner 502, which are standard-compatible equipment, can recognize the standard-compatible equipment search request. Then, each of the air conditioner 501 and the air conditioner 502 returns equipment information including, for example, a model name, an equipment name, an identification number, and an IP address value to the standard search function unit 125 (S6). However, the air conditioner 503, which is a vendor-specific equipment, cannot recognize the standard-compatible equipment search request, and thus does not respond.

Upon receiving the equipment information, the standard search function unit 125 additionally transmits a MAC address acquisition request to the air conditioner 501 and the air conditioner 502 determined to be standard-compatible equipment (S7). The standard search function unit 125 acquires the MAC address value returned from each of the air conditioner 501 and the air conditioner 502 (S8).

Thereafter, the controller 120 transmits the acquired equipment information and MAC address value to the IoT common API-compatible server 103. The IoT common API-compatible server 103 transmits the received equipment information and MAC address value to the equipment information input unit 132 (S9).

The equipment information input unit 132 inputs equipment information and a MAC address value of a standard-compatible equipment to the equipment management table 133, sets the common/extension flag value to "0", and registers each equipment (ST4).

FIG. 7 is an example of the equipment management table 133 after the equipment registration described with reference to FIGS. 5 and 6 is performed in the normal mode. As described above, by performing the equipment registration in the normal mode, the information on the air conditioners 501 and 502, which are the standard-compatible equipment, can be registered in the equipment management table 133. On the other hand, information on the air conditioner 503 which is the company-A-specific equipment cannot be registered in the equipment management table 133. Since the vendor name cannot be acquired from the equipment information, the vendor name is not registered and is described as N/A.

Although not illustrated in FIG. 6, after registering the information on the equipment in the equipment management table 133, the IoT common API-compatible server 103 transmits information indicating that the equipment registered in the equipment management table 133 is the control target to the common API-compatible application 110 of the user terminal 101. When the user selects the equipment control, the common API-compatible application 110 of the user terminal 101 that has received the information is displayed as the equipment to be controlled.

1-2. Extension Mode

Here, only by performing equipment registration in the standard mode, there is a case where all the equipment in the user home 102 are registered in the equipment management table 133 as the equipment to be controlled and are not displayed as the equipment to be controlled in the common API-compatible application 110 of the user terminal 101. For example, in the above example, the air conditioner 503 is not registered and is not displayed as the equipment to be controlled. In such a case, it is necessary to perform equipment registration in the extension mode.

Figure 8:
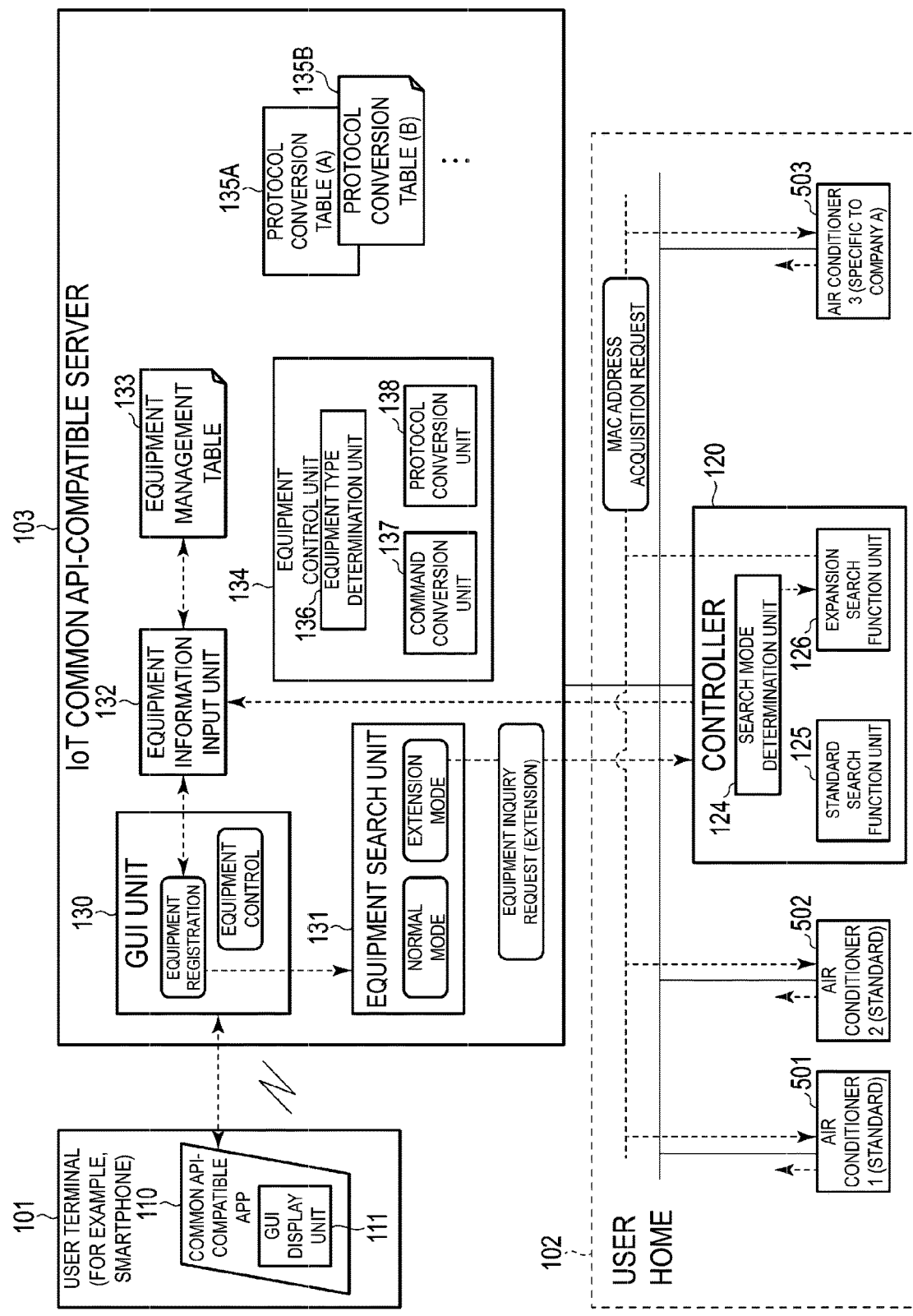
FIG. 8 is a diagram illustrating a flow of data between respective units of the home equipment management system in a case where equipment registration is performed in an extension mode.
Figure 9:
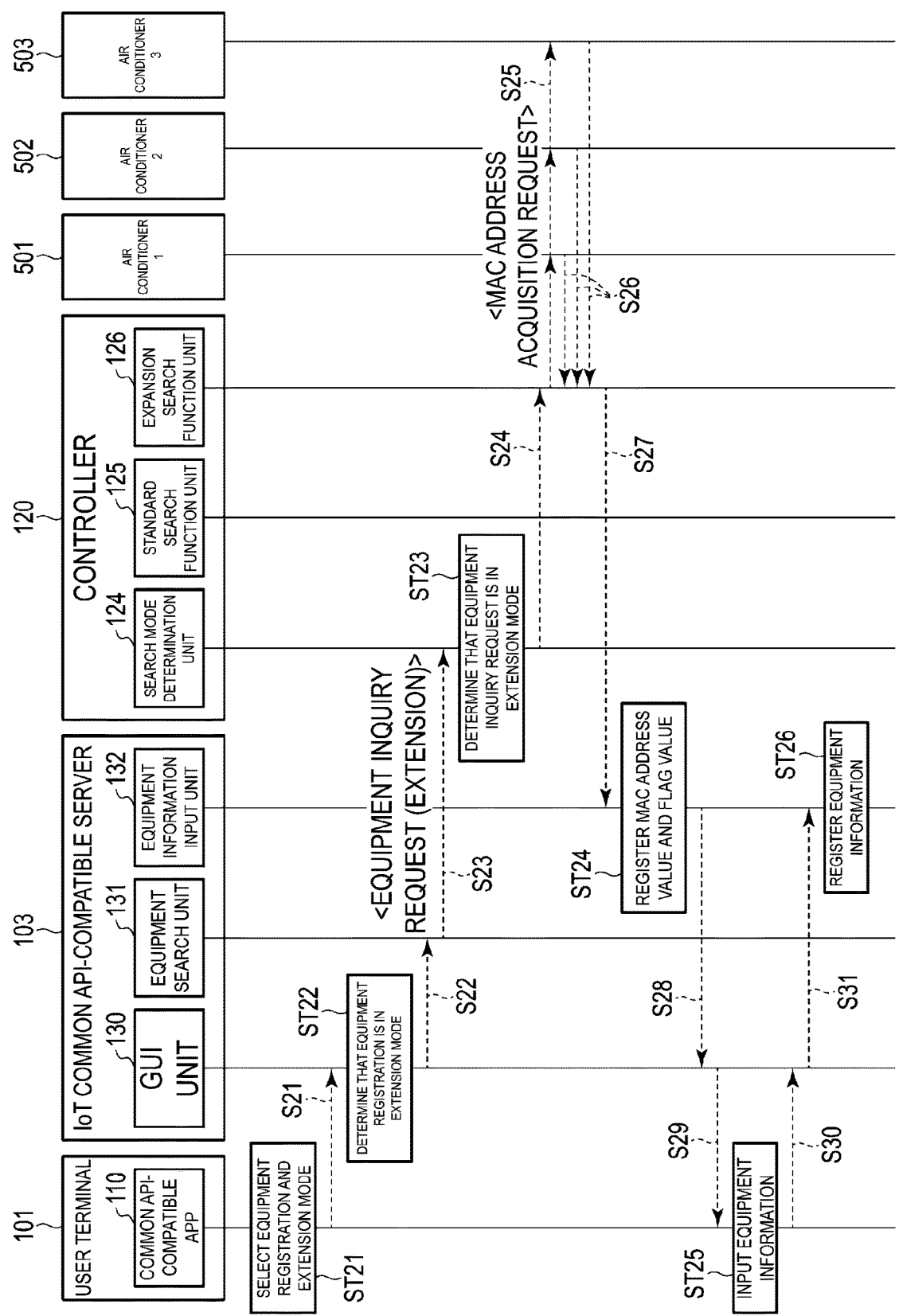
FIG. 9 is a sequence diagram illustrating data communication between respective units when equipment registration is performed in the extension mode.

FIG. 8 is a diagram illustrating a flow of data between respective units of the home equipment management system in a case where equipment registration is performed in the extension mode. FIG. 9 is a sequence diagram illustrating data communication between respective units when equipment registration is performed in the extension mode. In the example described here, it is assumed that the operation is performed after the equipment registration already described with reference to FIGS. 5 and 6 is performed in the normal mode. Thus, it is assumed that information about the air conditioner 501 and the air conditioner 502 illustrated in FIG. 7 is registered in the equipment management table 133.

When equipment registration is performed in the extension mode, the equipment search unit 131 operates in the extension mode and can transmit an equipment inquiry request (extension) to the controller 120. In response to reception of the equipment inquiry request (extension), the controller 120 can transmit a MAC address acquisition request by multicast from the expansion search function unit 126.

That is, in the common API-compatible application 110 of the user terminal 101, the user selects equipment registration through the GUI display unit 111 and further selects the extension mode (ST21).

In response to this, the common API-compatible application 110 of the user terminal 101 transmits an equipment registration request (extension) indicating that equipment registration is performed in the extension mode to the IoT common API-compatible server 103 (S21).

The IoT common API-compatible server 103 that has received the equipment registration request (extension) determines that the equipment registration is performed in the extension mode on the basis of the received equipment registration request (extension) in the GUI unit 130 (ST22). The GUI unit 130 transmits an instruction for the equipment search unit 131 to operate in the extension mode to the equipment search unit 131 (S22).

Upon receiving the instruction, the equipment search unit 131 operates in the extension mode, and transmits an equipment inquiry request (extension) to the controller 120 in the user home 102 corresponding to the user of user terminal 101 (S23).

As described above, the equipment search unit 131 functions as an inquiry unit that inquires the controller 120, which is the house control device, about information on the vendor-specific equipment in response to the registration request from the user terminal.

Upon receiving the equipment inquiry request (extension), the controller 120 determines in the search mode determination unit 124 that the received equipment inquiry request (extension) is in the extension mode (ST23). The search mode determination unit 124 transmits an instruction to perform a MAC address acquisition request to the expansion search function unit 126 (S24).

Upon receiving the instruction, the expansion search function unit 126 transmits a MAC address acquisition request to the air conditioners 501 to 503 by multicast via the home network (S25).

Upon receiving the MAC address acquisition request, the air conditioners 501 to 503 return the MAC address values and the IP address values to the expansion search function unit 126 (S26).

Thereafter, the controller 120 transmits the acquired MAC address values and IP address values to the IoT common API-compatible server 103. The IoT common API-compatible server 103 transmits the received MAC address values and IP address values to the equipment information input unit 132 (S27).

The equipment information input unit 132 collates the received MAC address values with the MAC address value registered in the equipment management table 133. As a result, for example, it is determined that the MAC address values of the air conditioner 501 and the air conditioner 502 have been registered, and the MAC address value of the air conditioner 503 has not been registered. Then, the equipment information input unit 132 determines that the unregistered equipment is a vendor-specific equipment, inputs the MAC address value and the IP address value to the equipment management table 133, and sets the common/extension flag value to "1" to register the air conditioner 503 (ST24).

As described above, the equipment information input unit 132 functions as a registration unit that registers, in the equipment management table 133, the information of the air conditioner 503 which is the vendor-specific equipment, together with the common/extension flag value which is the identification information indicating that the equipment is the vendor-specific equipment, the information including at least the address information of the vendor-specific equipment and being transmitted from the controller 120 as the house control device in response to the inquiry from the equipment search unit 131 as the inquiry unit.

Subsequently, the equipment information input unit 132 transmits, to the GUI unit 130, the MAC address value and the IP address value of each vendor-specific equipment currently registered in the equipment management table 133, which, in this example, is the air conditioner 503 (S28).

The GUI unit 130 transmits the MAC address value and the IP address value to the common API-compatible application 110 of the user terminal 101 (S29).

The common API-compatible application 110 of the user terminal 101 displays an equipment information input screen for causing the GUI unit 130 of the user terminal 101 to input the transmitted MAC address value and IP address value of the equipment as well as the equipment information including a model name, an equipment name, and a vendor name of the equipment. The user inputs the equipment information including a model name, an equipment name, and a vendor name on the equipment information input screen (ST25). Then, the common API-compatible application 110 of the user terminal 101 transmits the input equipment information to the IoT common API-compatible server 103 (S30).

The GUI unit 130 of the IoT common API-compatible server 103 receives the equipment information and transmits the equipment information to the equipment information input unit 132 (S31).

As described above, the GUI unit 130 and the equipment information input unit 132 function as confirmation units that transmit, to the user terminal 101, the address information which is the information of the vendor-specific equipment registered in the equipment management table 133 by the equipment information input unit 132 as the registration unit, and acquire the equipment information which is the result of being added by the user terminal 101.

Then, the equipment information input unit 132 inputs the equipment information transmitted from the GUI unit 130 to the equipment management table 133 of the unregistered equipment. Here, since the manufacturer code+IP address value is usually used as the identification number registered in the equipment management table 133, the equipment information input unit 132 automatically generates the identification number after inputting the equipment information and registers the identification number in the equipment management table 133 (ST26).

As described above, the equipment information input unit 132 functions as an update unit that updates the registered content of the vendor-specific equipment in the equipment management table 133 on the basis of the equipment information which is the addition result by the user terminal 101 acquired by the GUI unit 130 and the equipment information input unit 132 as the confirmation units.

FIG. 10 is an example of the equipment management table 133 after the equipment registration described with reference to FIGS. 8 and 9 is performed in the extension mode. As described above, by performing the equipment registration in the extension mode, the information on the air conditioner 503, which is the vendor company-A-specific equipment of which equipment registration has not been registered in the normal mode is registered in the equipment management table 133. Then, in the equipment management table 133, the value of the common/extension flag is registered as "0" in the standard-compatible equipment, and the value of the common/extension flag is registered as "1" in the vendor-specific equipment.

As described above, even a vendor-specific equipment that is not registered in the equipment management table 133 and is not displayed as an equipment to be controlled in the common API-compatible application 110 of the user terminal 101 only by performing equipment registration in the normal mode is registered in the equipment management table 133 and is displayed as equipment to be controlled in the common API-compatible application 110 of the user terminal 101.

(2. Equipment Control)

Figure 11:
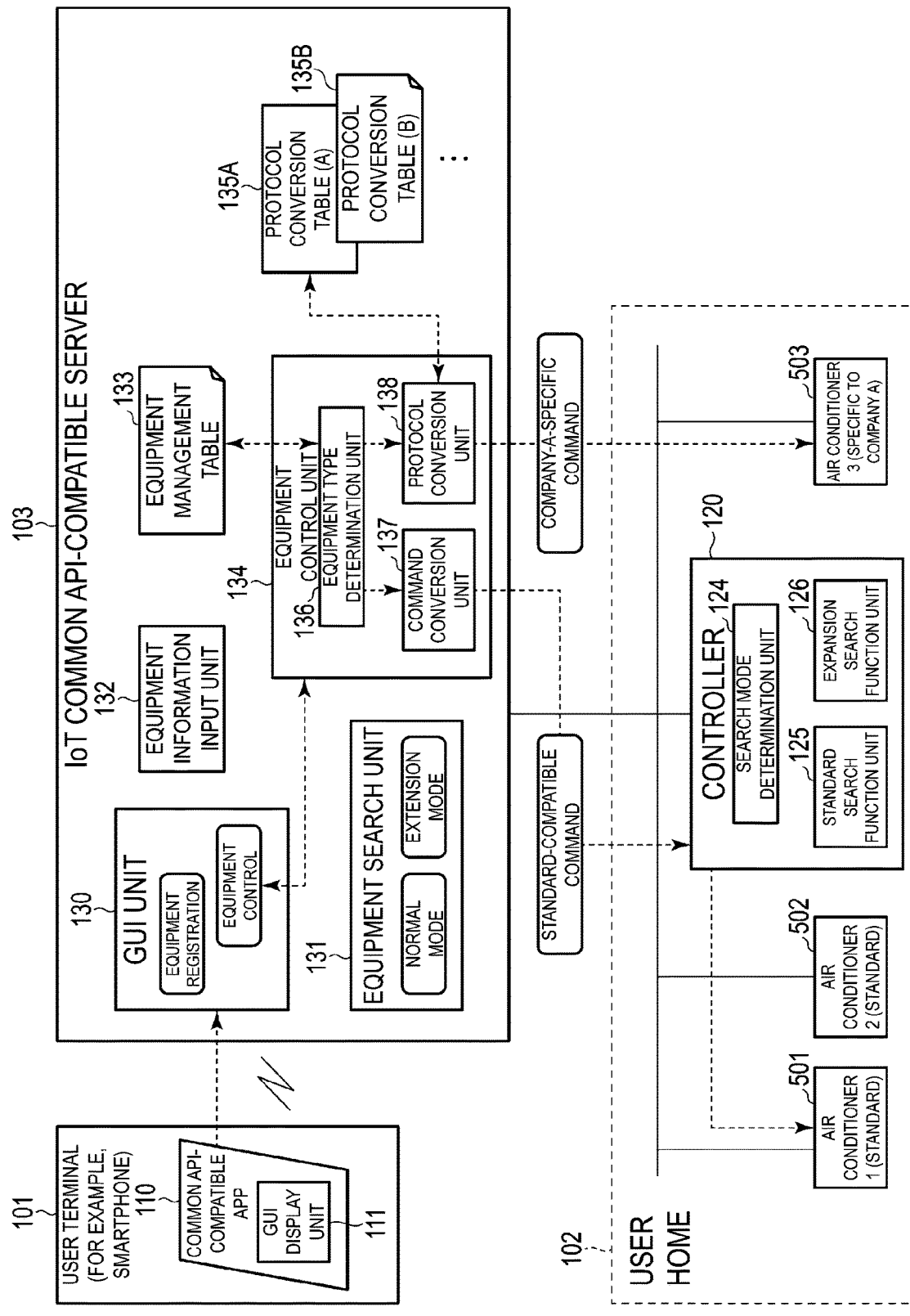
FIG. 11 is a diagram illustrating a flow of data between respective units of the home equipment management system in a case where equipment in the user home are controlled.

FIG. 11 is a diagram illustrating a flow of data between respective units of the home equipment management system in a case where the user controls the equipment in the user home 102. The equipment control is executed after the equipment registration described above is performed in the normal mode and the extension mode. For example, as illustrated in FIG. 10, it is assumed that information on each air conditioner is registered in the equipment management table 133. Furthermore, it is assumed that the protocol conversion tables (A) 135A and (B) 135B are created in advance by the operation source of the IoT common API-compatible server 103 and stored in the IoT common API-compatible server 103.

The equipment control unit 134 can cause the equipment type determination unit 136 to search the equipment to be controlled from the equipment management table 133 on the basis of the equipment control request message including the control information of the equipment from the common API-compatible application of the user terminal 101. When the common/extension flag of the searched equipment to be controlled is "0," the equipment control unit 134 determines that the equipment to be controlled is a standard-compatible equipment. On the other hand, when the value of the common/extension flag of the searched equipment to be controlled is "1," the equipment control unit 134 further confirms the vendor name of the equipment management table 133, and for example, when the vendor name is the company A, it is possible to determine that the equipment to be controlled is company-A-specific equipment.

Then, when determining that the equipment to be controlled is a standard-compatible equipment, the equipment type determination unit 136 transmits an equipment control request message to the command conversion unit 137. The command conversion unit 137 can convert the control information included in the equipment control request message into a standard-compatible command in a binary format and transmit the command to the controller 120. The controller 120 can control the equipment to be controlled by transmitting the standard-compatible command to the equipment to be controlled.

In addition, when determining that the equipment to be controlled is a vendor-specific equipment, for example, company-A-specific equipment, the equipment type determination unit 136 can transmit an equipment control request message and information indicating that the equipment to be controlled is company-A-specific equipment to the protocol conversion unit 138. The protocol conversion unit 138 refers to a corresponding protocol conversion table, for example, the protocol conversion unit 138 (A), and converts the control information included in the equipment control request message into a company-A-specific command in a binary format. Then, the protocol conversion unit 138 can control the equipment to be controlled by directly transmitting this command to the equipment to be controlled.

2-1. Standard-Compatible Equipment (Air Conditioner 501)

Figure 12:
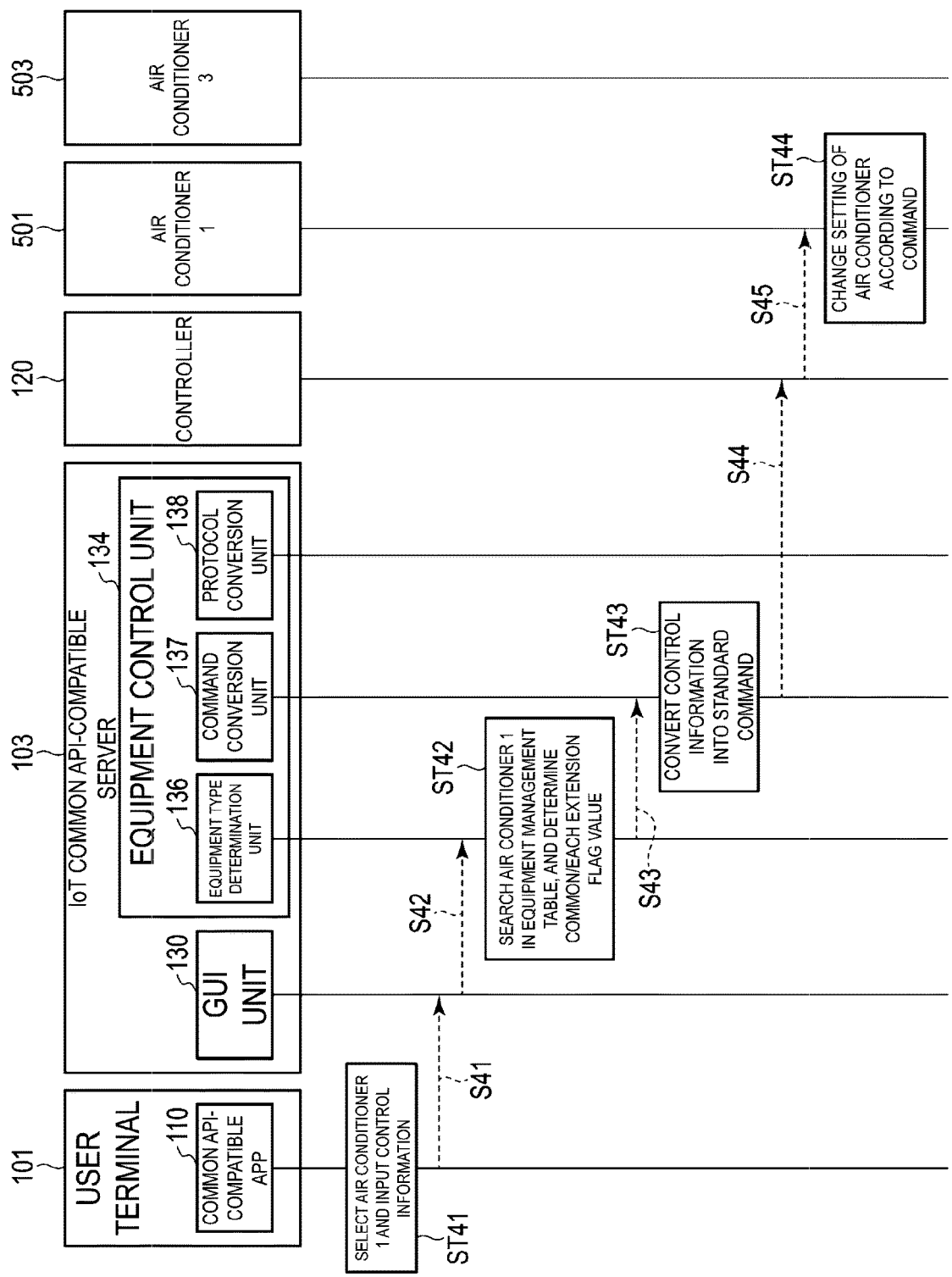
FIG. 12 is a sequence diagram illustrating data communication between respective units in a case where an air conditioner which is standard-compatible equipment is controlled.

FIG. 12 is a sequence diagram illustrating data communication between respective units when the air conditioner 501 which is a standard-compatible equipment is controlled.

When a control equipment is selected through the common API-compatible application 110 of the user terminal 101, a list of control target equipment is displayed on the GUI display unit 111. For example, the user selects the air conditioner 501. Furthermore, items on how to control the temperature, the air volume, and the wind direction are displayed on the GUI display unit 111, and thus, for example, the user inputs the set temperature to 20 degrees (ST41).

The common API-compatible application 110 creates an equipment control request message compatible with the common API including the control information selected and input by the user. Then, the common API-compatible application 110 of the user terminal 101 transmits the equipment control request message compatible with the common API to the GUI unit 130 of the IoT common API-compatible server 103 (S41).

The GUI unit 130 determines that the message received from the common API-compatible application 110 of the user terminal 101 is the equipment control request message including the control information, and transmits the equipment control request message compatible with the common API to the equipment type determination unit 136 of the equipment control unit 134 (S42).

The equipment type determination unit 136 determines that the equipment control request message compatible with the common API is directed to the air conditioner 501, searches the air conditioner 501 registered in the equipment management table 133, and checks the value of the common/extension flag. As illustrated in FIG. 7, since the value of the common/extension flag of the air conditioner 501 is "0," the equipment type determination unit 136 determines that the air conditioner 501 is a standard-compatible equipment (ST42).

Upon determining that the air conditioner 501 is a standard-compatible air conditioner, the equipment type determination unit 136 transmits the equipment control request message compatible with the common API including the control information to the command conversion unit 137 (S43).

The command conversion unit 137 converts the control information included in the received equipment control request message compatible with the common API into a standard-compatible command in a binary format (ST43). Then, the command conversion unit 137 transmits the standard-compatible command to the controller 120 at the user home 102 corresponding to the user terminal 101 (S44).

The controller 120 transmits the received command to the air conditioner 501 which is the equipment to be controlled (S45). The air conditioner 501 sets the temperature setting to 20 degrees according to the command (ST44).

2-2. Company-A-Specific Device (Air Conditioner 503)

Figure 13:
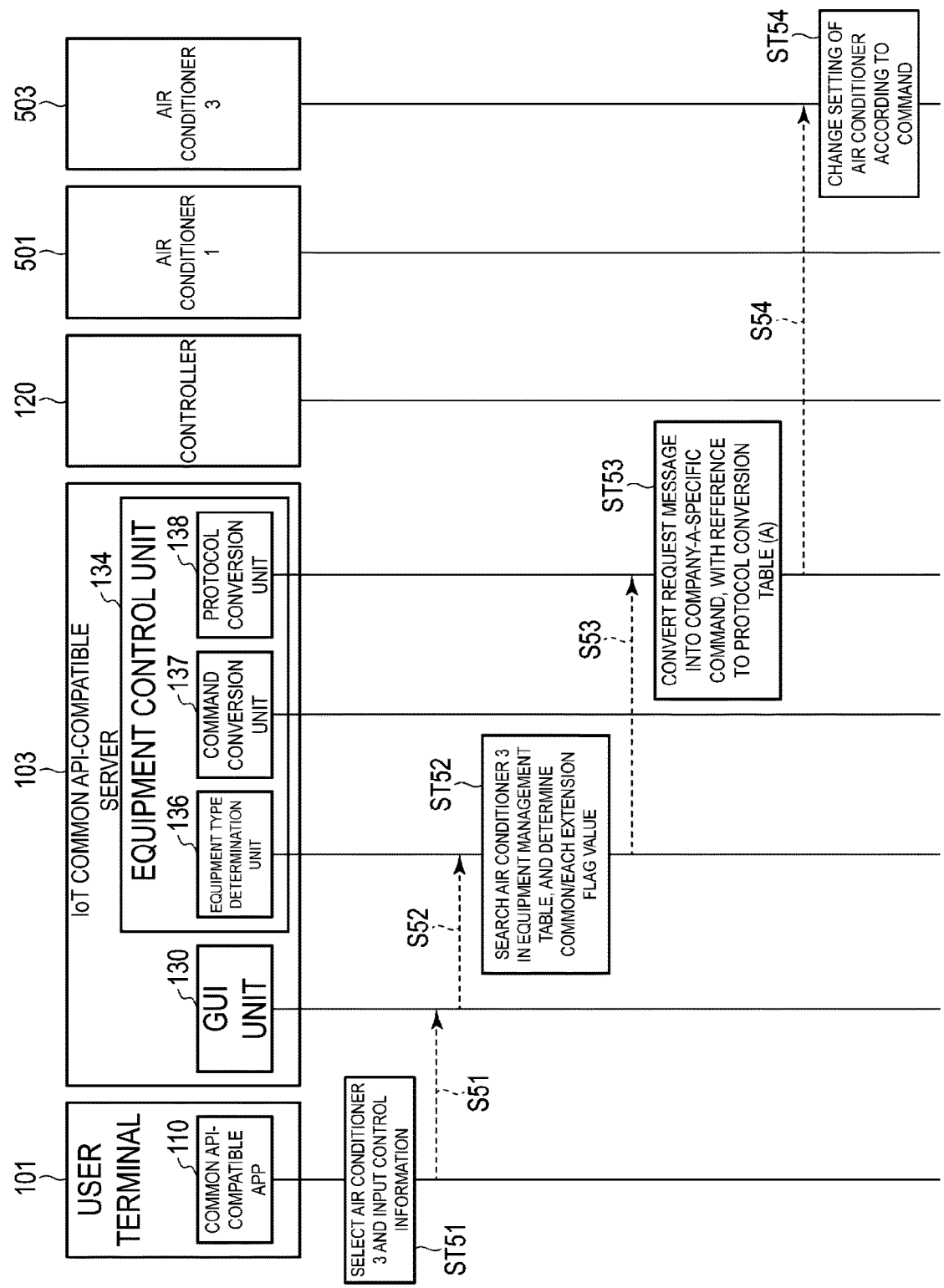
FIG. 13 is a sequence diagram illustrating data communication in a case where an air conditioner which is company-A-specific equipment is controlled.

FIG. 13 is a sequence diagram illustrating data communication between respective units when the air conditioner 503 which is the company-A-specific equipment is controlled.

When a control equipment is selected through the common API-compatible application 110 of the user terminal 101, a list of control target equipment is displayed on the GUI display unit 111. For example, the user selects the air conditioner 503. Furthermore, items on how to control the temperature, the air volume, and the wind direction are displayed on the GUI display unit 111, and thus, for example, the user inputs the set temperature to 20 degrees (ST51).

The common API-compatible application 110 creates an equipment control request message compatible with the common API including the control information selected and input by the user. Then, the common API-compatible application 110 of the user terminal 101 transmits the equipment control request message compatible with the common API to the GUI unit 130 of the IoT common API-compatible server 103 (S51).

The GUI unit 130 determines that the message received from the common API-compatible application 110 of the user terminal 101 is the equipment control request message including the control information, and transmits the equipment control request message compatible with the common API to the equipment type determination unit 136 of the equipment control unit 134 (S52).

In this manner, the GUI unit 130 functions as a request reception unit that receives an equipment control message, which is a control request including equipment to be controlled and a control content of the equipment in the user home 102, from the user terminal 101.

The equipment type determination unit 136 determines that the equipment control request message compatible with the common API is directed to the air conditioner 503, searches the air conditioner 503 registered in the equipment management table 133, and checks the value of the common/extension flag. As illustrated in FIG. 7, since the value of the common/extension flag of the air conditioner 503 is "1," the equipment type determination unit 136 further checks the vendor name registered in the equipment management table 133. Since the registered vendor name is the company A, the equipment type determination unit 136 determines that the air conditioner 503 is company-A-specific equipment (ST52).

As described above, the equipment type determination unit 136 functions as a discrimination unit that determines whether the equipment to be controlled included in the control request received by the GUI unit 130 as a request reception unit is a standard-compatible equipment or a vendor-specific equipment by referring to the equipment management table 133.

Upon determining that the air conditioner 503 is a company-A-specific air conditioner, the equipment type determination unit 136 transmits the equipment control request message compatible with the common API including the control information and the information indicating that the air conditioner 503 is company-A-specific equipment, to the protocol conversion unit 138 (S53).

The protocol conversion unit 138 refers to the corresponding protocol conversion table (A) 135A on the basis of the received information indicating that the equipment is the company-A-specific equipment, and converts the control information included in the equipment control request message compatible with the common API into a company-A-specific command in a binary format (ST53).

Further, the protocol conversion unit 138 directly transmits the company-A-specific command to the air conditioner 503 which is a control target of the user home 102 corresponding to the user terminal 101 without going through the controller 120 (S54).

As described above, the protocol conversion unit 138 functions as a conversion unit that refers to the protocol conversion table to convert the control content included in the control request into a vendor-specific command, and transmits the command to the air conditioner 503 which is equipment to be controlled.

The air conditioner 503 that has received the command from the protocol conversion unit 138 sets the temperature setting to 20 degrees according to the command (ST54).

Actions and Effects

As described above, according to the first embodiment, the IoT common API-compatible server 103 can recognize the vendor-specific equipment without the vendor having the specific equipment specially modifying the own product, and the common API-compatible application 110 can access the vendor-specific equipment. Furthermore, by holding the protocol conversion table in the IoT common API-compatible server 103, the common API specification can be converted into a vendor-specific specification, and the vendor-specific equipment can be referred to and controlled using the common API-compatible application 110.

As a result, the user can uniformly refer to and control the standard-compatible equipment and the vendor-specific equipment using only the common API-compatible application 110. The user only needs to install only the common API-compatible application 110 in the user terminal 101, and it is not necessary to switch and use the common API-compatible application 110 and the vendor-specific application for each control target model, which improves convenience.

Second Embodiment

Configuration

Figure 14:
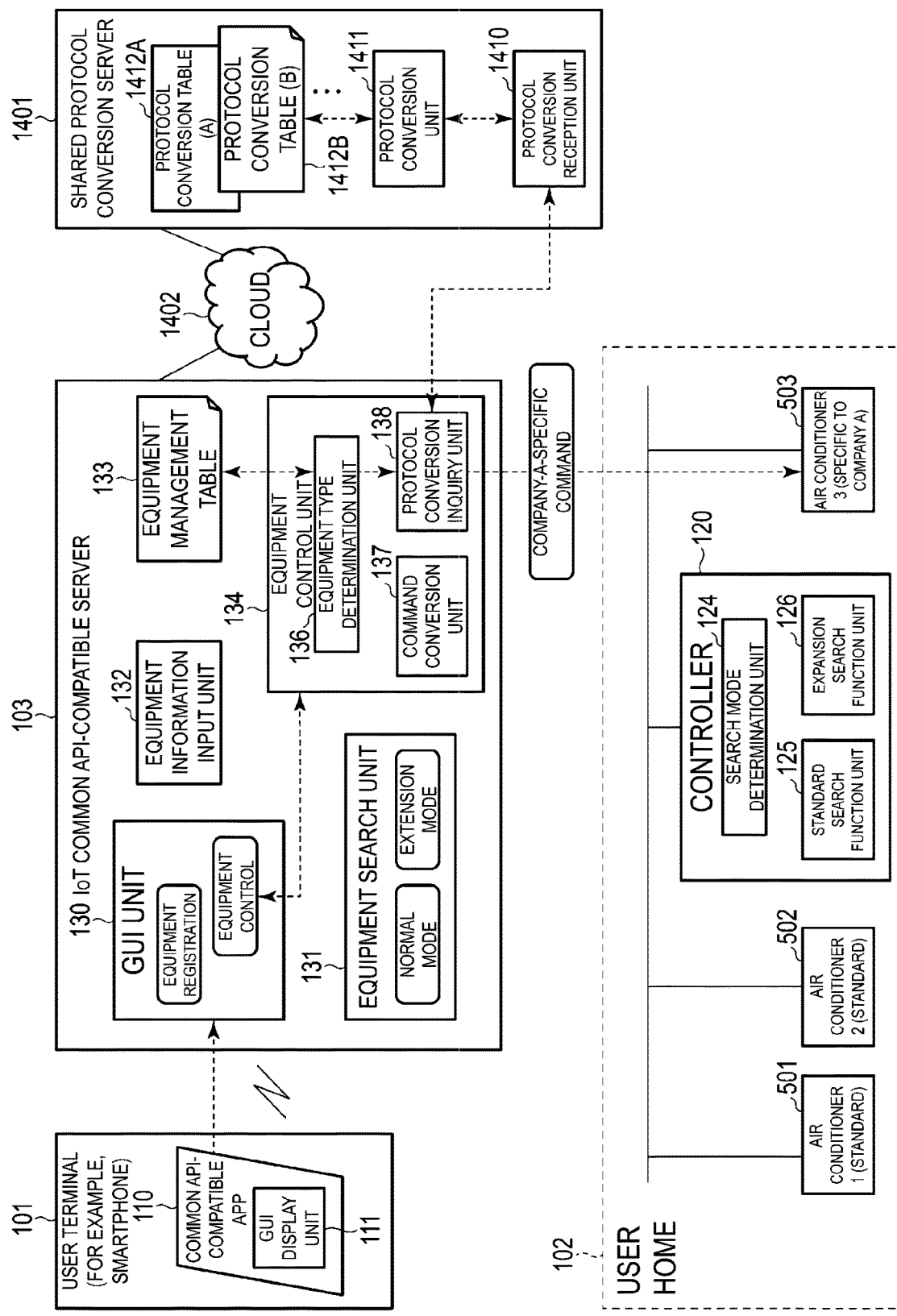
FIG. 14 is a diagram illustrating an overall configuration of a home equipment management system according to a second embodiment of the present disclosure and a flow of data between respective units of the home equipment management system in a case where equipment in the user home is controlled.

FIG. 14 is a diagram illustrating an overall configuration of a home equipment management system according to a second embodiment of the present disclosure and a flow of data between respective units of the home equipment management system in a case where equipment in a user home is controlled. The home equipment management system according to the present embodiment is different from the first embodiment in the following points. That is, in the present embodiment, the protocol conversion function does not exist in the IoT common API-compatible server 103, but exists in a shared protocol conversion server 1401 on a cloud 1402.

The shared protocol conversion server 1401 includes a protocol conversion reception unit 1410, a protocol conversion unit 1411, and a plurality of protocol conversion tables 1412A, 1412B, and so forth. The shared protocol conversion server 1401 is operated by a third-party organization, and can protocol-convert the common API into a vendor-specific API for the registered equipment of the participating vendor (for example, company A and company B). In addition, it is assumed that the protocol conversion tables 1412A, 1412B, and so forth are created in advance by the participating vendor or the operating organization of the shared protocol conversion server 1401, and are stored in the shared protocol conversion server 1401. Furthermore, the shared protocol conversion server 1401 can be realized by a computer configuration as illustrated in FIG. 4.

Furthermore, in the second embodiment, the IoT common API-compatible server 103 includes a protocol conversion inquiry unit 1438 in place of the protocol conversion unit 138 in the equipment control unit 134. The protocol conversion inquiry unit 1438 can communicate with the protocol conversion reception unit 1410 of the shared protocol conversion server 1401 via the cloud 1402. When the equipment to be controlled is a vendor-specific equipment, such as the air conditioner 503 in the equipment type determination unit 136, the protocol conversion inquiry unit 1438 can transmit, to the shared protocol conversion server 1401 via the cloud 1402, an equipment control request message compatible with the common API including the control information of the equipment and information indicating that the air conditioner 503 is company-A-specific equipment.

The shared protocol conversion server 1401 can receive the equipment control request message compatible with the common API and the information from the protocol conversion inquiry unit 1438 by the protocol conversion reception unit 1410 and transfer the information to the protocol conversion unit 1411.

The protocol conversion unit 1411 refers to the protocol conversion tables 1412A, 1412B, and so forth on the basis of the information, and can convert the control information included in the equipment control request message compatible with the common API into a vendor-specific command in a binary format. The protocol conversion unit 1411 can return this command to the protocol conversion inquiry unit 1438 of the IoT common API-compatible server 103 on the cloud 1402 via the protocol conversion reception unit 1410.

Operation

In the second embodiment, since the operation of equipment registration and the control of the standard-compatible equipment are the same as those in the first embodiment, the description thereof will be omitted. Only the operation in the case of controlling, for example, the air conditioner 503 which is a vendor-specific equipment will be described. Here, it is assumed that the equipment control is executed after the equipment registration described in the first embodiment is performed in the normal mode and the extension mode. As illustrated in FIG. 10, it is assumed that information on each of the air conditioners 501 to 503 is registered in the equipment management table 133.

Figure 15:
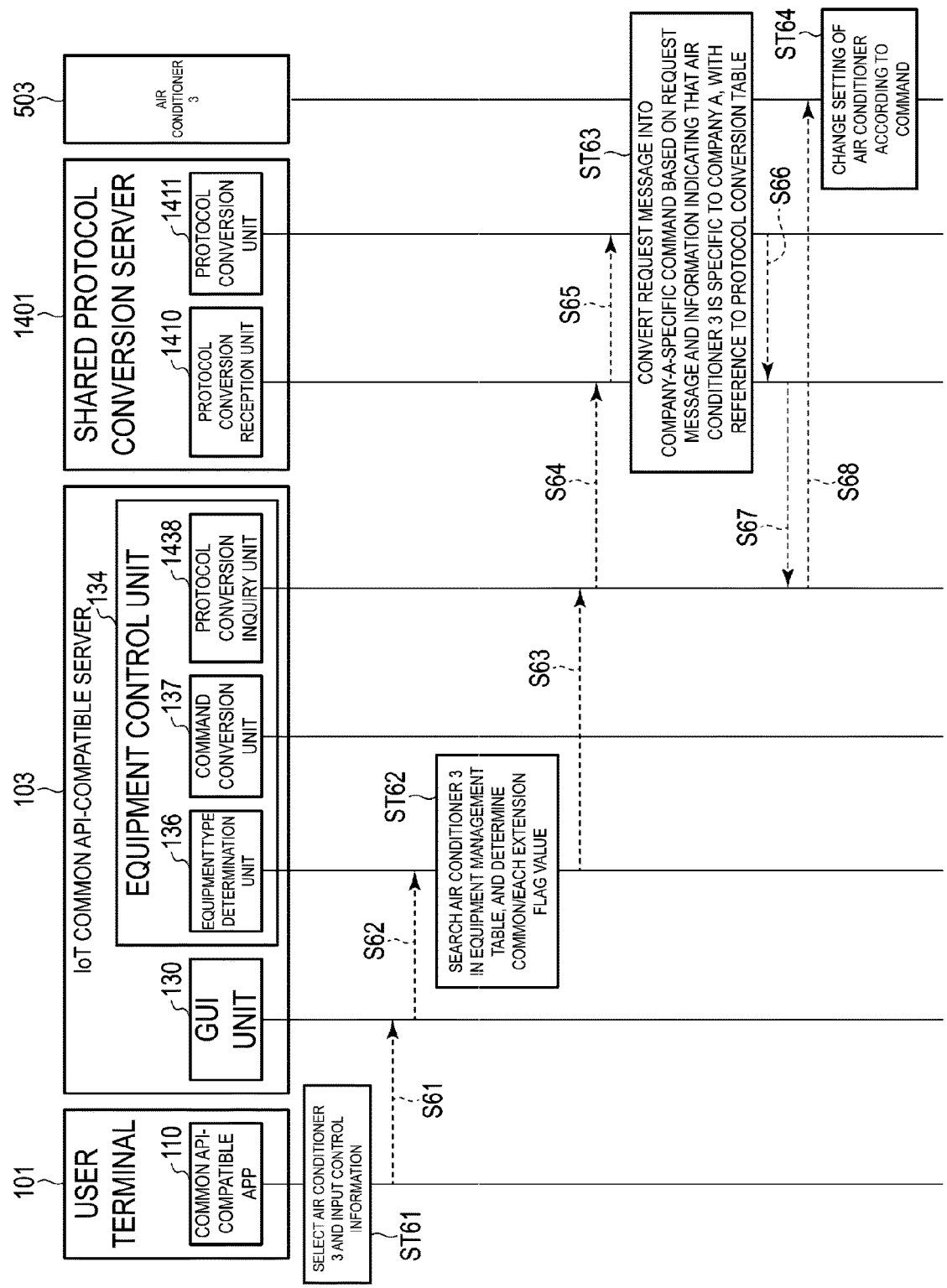
FIG. 15 is a sequence diagram illustrating data communication in a case where an air conditioner which is company-A-specific equipment is controlled.

FIG. 15 is a sequence diagram illustrating data communication in the case of controlling the air conditioner 503 which is company-A-specific equipment in the home equipment management system configured as illustrated in FIG. 14.

When a control equipment is selected through the common API-compatible application 110 of the user terminal 101, a list of control target equipment is displayed on the GUI display unit 111. For example, the user selects the air conditioner 503. In addition, items on how to control the temperature, the air volume, and the wind direction are displayed on the GUI display unit 111, and thus, for example, the user inputs the set temperature to 20 degrees (ST61).

The common API-compatible application 110 creates an equipment control request message compatible with the common API including the control information selected and input by the user. Then, the common API-compatible application 110 of the user terminal 101 transmits the equipment control request message compatible with the common API to the GUI unit 130 of the IoT common API-compatible server 103 (S61).

The GUI unit 130 determines that the message received from the common API-compatible application 110 of the user terminal 101 is the equipment control request message including the control information, and transmits the equipment control request message compatible with the common API to the equipment type determination unit 136 of the equipment control unit 134 (S62).

The equipment type determination unit 136 determines that the equipment control request message compatible with the common API is directed to the air conditioner 503, searches the air conditioner 503 registered in the equipment management table 133, and checks the value of the common/extension flag. As illustrated in FIG. 7, since the value of the common/extension flag of the air conditioner 3503 is "1," the equipment type determination unit 136 further checks the vendor name registered in the equipment management table 133. Since the registered vendor name is company A, the equipment type determination unit 136 determines that the air conditioner 503 is company-A-specific equipment (ST62).

Upon determining that the air conditioner 503 is a company-A-specific air conditioner, the equipment type determination unit 136 transmits the equipment control request message compatible with the common API including the control information and the information indicating that the air conditioner 503 is company-A-specific equipment, to the protocol conversion inquiry unit 1438 (S63).

The protocol conversion inquiry unit 1438 transmits, to the shared protocol conversion server 1401 on the cloud 1402, the equipment control request message compatible with the common API including the control information and the information indicating that the air conditioner 503 is company-A-specific equipment, for example, the vendor name indicating a vendor registered in the equipment management table 133 (S64). In the shared protocol conversion server 1401, the protocol conversion reception unit 1410 receives the request message and the information, and the protocol conversion reception unit 1410 transfers the request message and the information to the protocol conversion reception unit (S65).

The protocol conversion unit 1411 refers to the corresponding protocol conversion table (A) 1412A on the basis of the received information indicating that the equipment is company-A-specific equipment, and converts the control information included in the equipment control request message compatible with the common API into a company-A-specific command in a binary format (ST63).

The protocol conversion unit 1411 transmits the command to the protocol conversion reception unit 1410 (S66). The protocol conversion reception unit 1410 transmits the command to the IoT common API-compatible server 103 on the cloud 1402 (S67).

In the IoT common API-compatible server 103, the command is received by the protocol conversion inquiry unit 1438. The protocol conversion inquiry unit 1438 directly transmits the received company-A-specific command to the air conditioner 503 which is a control target in the user home 102 corresponding to the user terminal 101 without going through the controller 120 (S68).

As described above, the protocol conversion inquiry unit 1438 functions as a conversion unit. The conversion unit transmits the control content included in the control request from the user terminal 101 and the information indicating the vendor included in the equipment information registered in the equipment management table 133 for the control target equipment determined by the equipment type determination unit 136 as the discrimination unit to the shared protocol conversion server 1401 which is a conversion server that converts the control content into a vendor-specific command, via the wide area network, receives the command converted by the conversion server, converts the control content into the vendor-specific command, and transmits the vendor-specific command to the air conditioner 503 which is the control target equipment.

The air conditioner 503 that has received the command from the protocol conversion inquiry unit 1438 sets the temperature setting to 20 degrees according to the command (ST64).

Actions and Effects

As described above, according to the second embodiment, the IoT common API-compatible server 103 can recognize the vendor-specific equipment without the vendor having the specific equipment specially modifying the own product, and the common API-compatible application can access the vendor-specific equipment. Further, by holding the protocol conversion table in the shared protocol conversion server 1401, the common API specification can be converted into a vendor-specific specification, and the vendor-specific equipment can be referred to and controlled using the common API-compatible application 110.

As a result, the user can uniformly refer to and control the standard-compatible equipment and the vendor-specific equipment using only the common API-compatible application 110. The user only needs to install only the common API-compatible application 110 in the user terminal 101, and it is not necessary to switch and use the common API-compatible application 110 and the vendor-specific application for each control target model, which improves convenience.

Furthermore, since the shared protocol conversion server 1401 operated by the third-party organization provides the protocol conversion function, the IoT common API-compatible server 103 does not need to prepare the function. As long as the third-party organization provides the shared protocol conversion server 1401 with an appropriate protocol conversion table at an appropriate time, various equipment in the user home 102 can be managed.

Third Embodiment

Configuration

Figure 16:
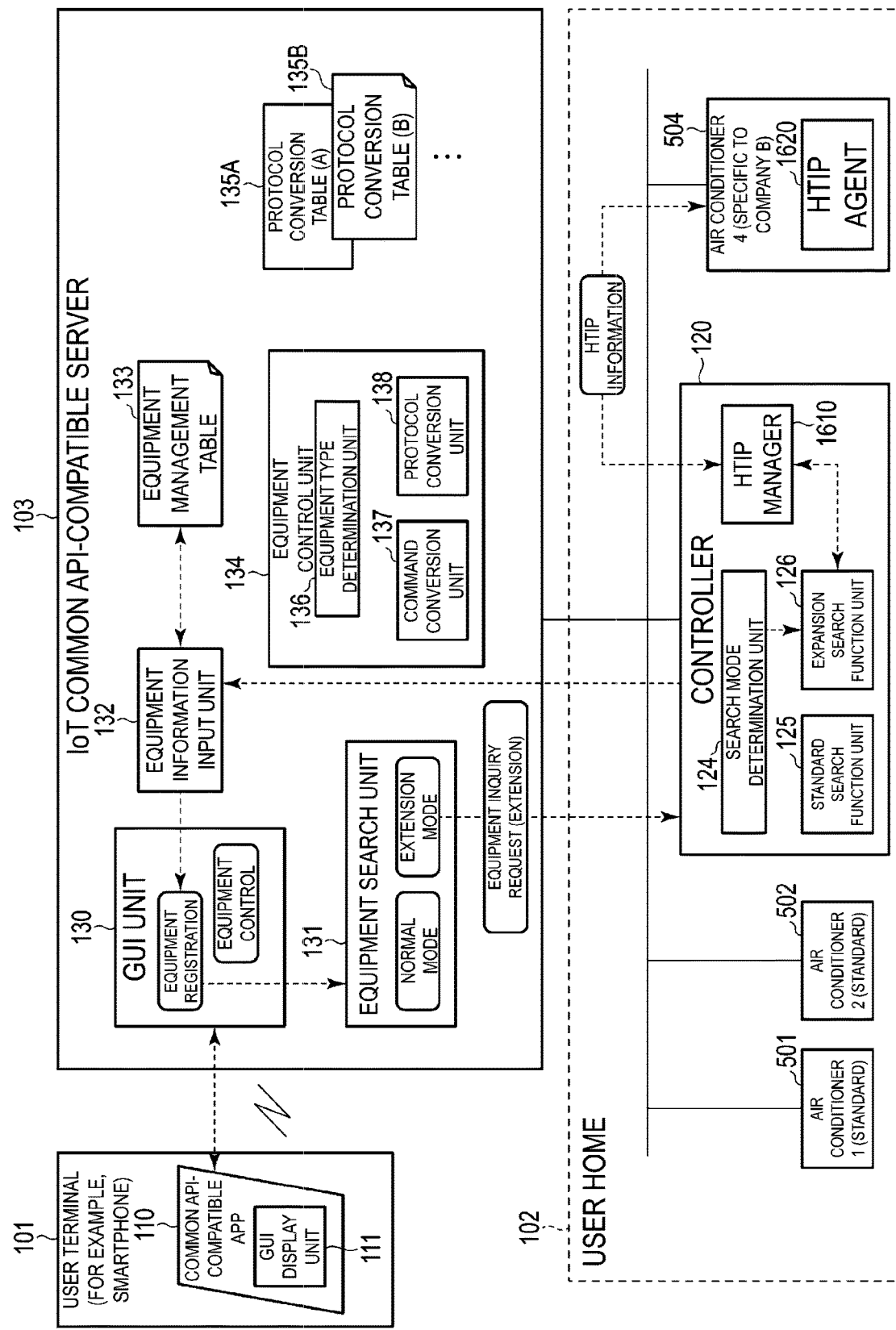
FIG. 16 is a diagram illustrating an overall configuration of a home equipment management system according to a third embodiment of the present disclosure and a flow of data between respective units of the home equipment management system in a case where equipment registration is performed in the extension mode.

FIG. 16 is a diagram illustrating an overall configuration of a home equipment management system according to a third embodiment of the present disclosure and a flow of data between respective units of the home equipment management system in a case where equipment registration is performed in the extension mode. In the first embodiment, when equipment registration is performed in the extension mode, MAC address values are acquired from all equipment. As one of methods for estimating an equipment name in a network, there is a Home-network Topology Identifying Protocol (HTIP) method (see, for example, JJ-300.00, "Home-network Topology Identifying Protocol," https://www.ttc.or.jp/application/files/5815/5321/8935/JJ-300.00v3.pdf.). In the third embodiment, a method of performing equipment registration in an extended manner using the HTIP system will be described.

Figure 17:
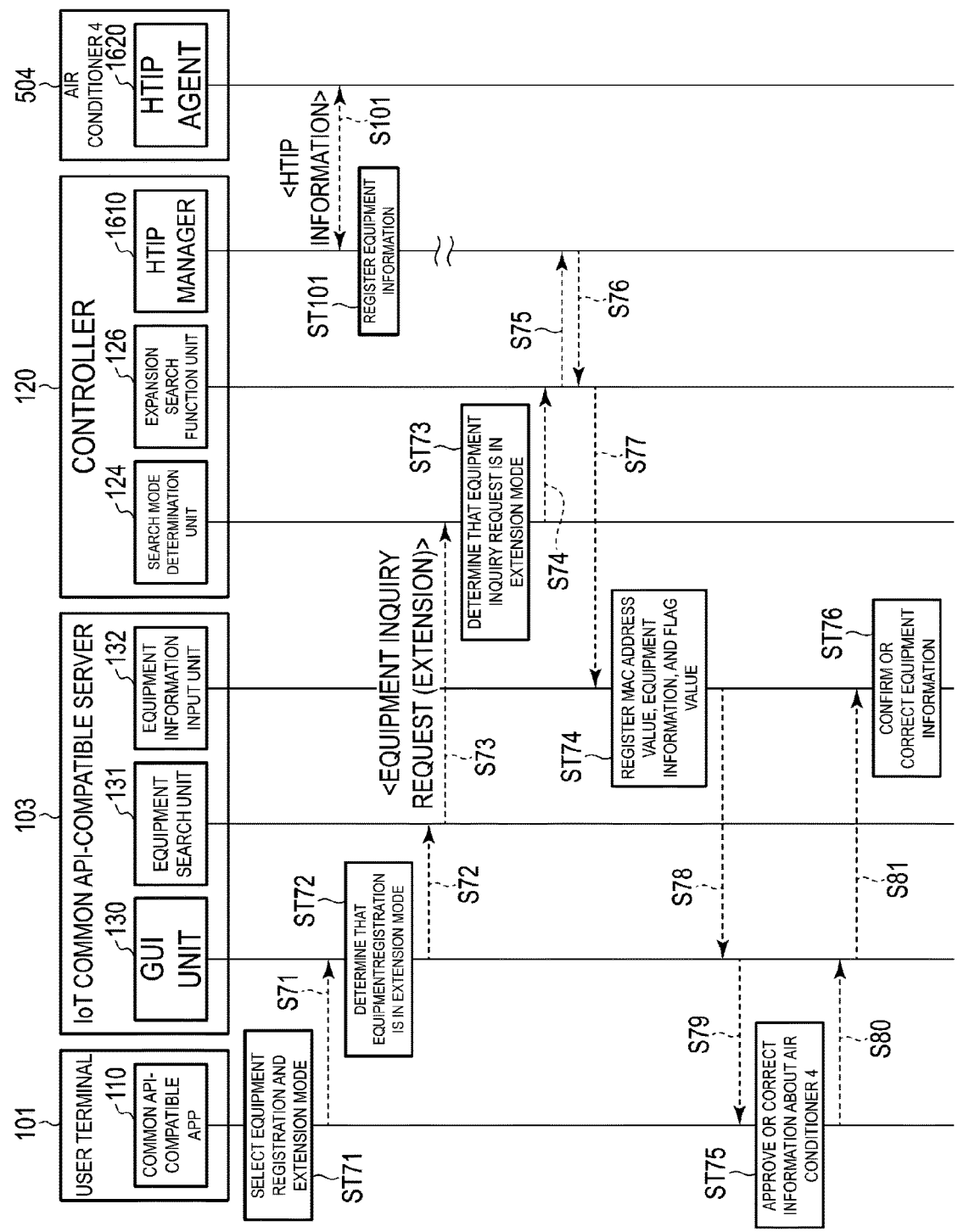
FIG. 17 is a sequence diagram illustrating data communication between respective units when equipment registration is performed in the extension mode.

In the third embodiment, it is assumed that the controller 120 in the user home 102 and the air conditioner 504 which is a company-B-specific equipment (illustrated as the air conditioner 4 (standard) in FIG. 16, and illustrated as the air conditioner 4 in FIG. 17) are compatible with the HTIP system. The controller 120 includes an HTIP manager 1610 and the air conditioner 504 includes an HTIP agent 1620. The HTIP manager 1610 and the HTIP agent 1620 are communicable via a home network. The HTIP agent 1620 can communicate with the HTIP manager 1610 at any time and transmit HTIP information including equipment information of the air conditioner 504 to the HTIP manager 1610. In addition, the HTIP manager 1610 can store the equipment information. Other configurations are the same as those of the first embodiment.

Operation

In the third embodiment, since the operation of equipment registration in the normal mode and the operation of equipment control are the same as those in the first embodiment, the description thereof will be omitted.

FIG. 17 is a sequence diagram illustrating data communication between respective units when equipment registration is performed in the extension mode.

In the air conditioner 504 in the user home 102, the HTIP agent 1620 communicates with the HTIP manager 1610 in the controller 120 at any timing, and transmits, to the HTIP manager 1610 as HTIP information, the IP address value and the MAC address value of the air conditioner 504, and the equipment information including a model name, an equipment name, and a manufacturer code (S101). As a result, the HTIP manager 1610 stores the HTIP information including the equipment information of the air conditioner 504 (ST101).

Then, in the common API-compatible application 110 of the user terminal 101, the user selects equipment registration through the GUI display unit 111 and further selects the extension mode (ST71).

In response to this, the common API-compatible application 110 of the user terminal 101 transmits an equipment registration request (extension) indicating that equipment registration is performed in the extension mode to the IoT common API-compatible server 103 (S71).

The IoT common API-compatible server 103 that has received the equipment registration request (extension) determines that the equipment registration is performed in the extension mode on the basis of the received equipment registration request (extension) in the GUI unit 130 (ST72). The GUI unit 130 transmits an instruction for the equipment search unit 131 to operate in the extension mode to the equipment search unit 131 (S72).

Upon receiving the instruction, the equipment search unit 131 operates in the extension mode, and transmits an equipment inquiry request (extension) to the controller 120 at the user home 102 corresponding to the user of user terminal 101 (S73).

Upon receiving the equipment inquiry request (extension), the controller 120 determines in the search mode determination unit 124 that the received equipment inquiry request (extension) is in the extension mode (ST73). The search mode determination unit 124 transmits an instruction to perform a MAC address acquisition request to the expansion search function unit 126 (S74).

Upon receiving the instruction, the expansion search function unit 126 inquires the HTIP manager 1610 via the home network (S75). Upon receiving this inquiry, the HTIP manager 1610 returns HTIP information including an IP address value and a MAC address value stored for a vendor-specific equipment compatible with the HTIP system, which, in this example, is the air conditioner 504, and equipment information including a model name, an equipment name, and a manufacturer code to the expansion search function unit 126 (S76). As a result, the expansion search function unit 126 can acquire the IP address value, the MAC address value, and the equipment information regarding the vendor-specific equipment compatible with the HTIP system in the user home 102.

The controller 120 transmits the IP address value, the MAC address value, and the equipment information acquired by the expansion search function unit 126 to the IoT common API-compatible server 103. The IoT common API-compatible server 103 transmits the received information to the equipment information input unit 132 (S77).

The equipment information input unit 132 collates the MAC address value included in the received information with the MAC address value registered in the equipment management table 133. As a result, for example, it is determined that the MAC address value of the air conditioner 504 is unregistered. Then, the equipment information input unit 132 estimates the vendor name from the manufacturer code of the equipment information included in the received information. In addition, the equipment information input unit 132 creates an identification number from the manufacturer code and the IP address value included in the information received in the same manner. Then, the equipment information input unit 132 inputs, to the equipment management table 133, the estimated or created model name, equipment name, identification number, IP address value, MAC address value, and vendor name of the air conditioner 504 included in the received information. Then, the equipment information input unit 132 sets the value of the common/extension flag of the air conditioner 504 to "1." In this way, the equipment information input unit 132 registers the air conditioner 504 in the equipment management table 133 (ST74).

Thereafter, the equipment information input unit 132 transmits, to the GUI unit 130, the information including an IP address value, a MAC address value, a vendor name, a model name, and an equipment name of each vendor-specific equipment currently registered in the equipment management table 133, which, in this example, is the air conditioner 504 (S78).

The GUI unit 130 transmits these pieces of information to the common API-compatible application 110 of the user terminal 101 (S79).

The common API-compatible application 110 of the user terminal 101 displays the transmitted information on the GUI unit 130 of the user terminal 101, and displays a confirmation screen for prompting the user to confirm whether the information is correct. The user confirms whether these pieces of information are correct, and if the information is correct, performs an approval operation on the confirmation screen, and if there is an error, performs a correction operation to correct the error part (ST75). The common API-compatible application 110 of the user terminal 101 transmits confirmation result information indicating a result of the confirmation by the user to the IoT common API-compatible server 103 (S80).

The GUI unit 130 of the IoT common API-compatible server 103 receives the confirmation result information from the user terminal 101 and transfers the confirmation result information to the equipment information input unit 132 (S81).

As described above, the GUI unit 130 and the equipment information input unit 132 function as confirmation units that transmit, to the user terminal 101, the address information and the equipment information that are the information of the vendor-specific equipment registered in the equipment management table 133 by the equipment information input unit 132 as the registration unit, and acquire the approval result or the correction result of the equipment information by the user terminal 101.

The equipment information input unit 132 confirms or corrects the information input to the equipment management table 133 of the air conditioner 504 on the basis of the confirmation result information transmitted from the GUI unit 130 (ST76).

As described above, the equipment information input unit 132 functions as an update unit that confirms or corrects the registered content of the vendor-specific equipment in the equipment management table 133 on the basis of the confirmation result information which is the confirmation result by the user terminal 101 acquired by the GUI unit 130 and the equipment information input unit 132 as the confirmation units.

Actions and Effects

As described above, according to the third embodiment, similarly to the first and second embodiments, the IoT common API-compatible server 103 can recognize the vendor-specific equipment without the vendor having the specific equipment specially modifying the own product.

As a result, the user can uniformly refer to and control the standard-compatible equipment and the vendor-specific equipment using only the common API-compatible application 110. The user only needs to install only the common API-compatible application 110 in the user terminal 101, and it is not necessary to switch and use the common API-compatible application 110 and the vendor-specific application for each control target model, which improves convenience.

Even when the vendor-specific equipment is compatible with the HTIP system, the vendor-specific equipment can be registered in the equipment management table 133, and the equipment information can be acquired from the equipment, so that the user does not need to input the equipment information.

Other Embodiments

Further, the present disclosure is not limited to the above-described embodiments. For example, the first embodiment and the third embodiment can be combined. The controller 120 can transmit the MAC address value and the IP address value of each of the air conditioner 501 and the air conditioner 502, which are standard-compatible equipment and are not compatible with the HTIP system, and the air conditioner 503, which is a vendor-specific equipment, to the IoT common API-compatible server 103, and transmit the MAC address value and the IP address value of the air conditioner 504, which is a vendor-specific equipment compatible with the HTIP system, and the equipment information to the IoT common API-compatible server 103. In this case, the user can input necessary information for the air conditioner 503 by the common API-compatible application 110 of the user terminal 101 and check the acquisition information of the air conditioner 504.

In addition, the method described in the above embodiments can be stored in a recording medium such as a magnetic disk (Floppy (trade name) disk, hard disk, and the like), an optical disk (CD-ROM, DVD, MO, etc.), or a semiconductor memory (ROM, RAM, flash memory, and the like) as a program (software means) that can be executed by a computer, and can also be distributed by being transmitted through a communication medium. The program stored in a medium also includes a setting program for loading software means (including not only an execution program but also a table and a data structure) executed by a calculator in the calculator. A calculator implementing the present apparatus executes the above-described processing by loading the program recorded on the recording medium or constructing software means using the setting program in some cases, and controlling an operation using the software means. The recording medium described in the present specification is not limited to a recording medium for distribution, and includes a storage medium such as a magnetic disk or a semiconductor memory provided in equipment connected inside a computer or via a network.

In short, the present disclosure is not limited to the above-described embodiments as it is and can be embodied by modifying the constituent components within the scope not departing from the gist of the disclosure when implemented. In addition, various inventions can be formed by appropriately combining a plurality of constituent elements disclosed in the above-described embodiments. For example, several components may be deleted from all of the components illustrated in the embodiments. Furthermore, components of different embodiments may be appropriately combined with each other.

REFERENCE SIGNS LIST

100 Home equipment management system
101 User terminal
102 User home
103 IoT common API-compatible server
110 Common API-compatible application
111 GUI display unit
120 Controller
121 to 123 Equipment
124 Search mode determination unit
125 Standard search function unit
126 Expansion search function unit
130 GUI unit
131 Equipment search unit
132 Equipment information input unit
133 Equipment management table
134 Equipment control unit
135A, 135B, 1412A, 1412B Protocol conversion table
136 Equipment type determination unit
137 Command conversion unit
138, 1411 Protocol conversion unit
401 Processor
402 Program memory
403 Data memory
404 Storage
405 Input/output interface
406 Communication interface
407 Bus
408 Communication device
409 Input unit
410 Display unit
501 to 504 Air conditioner
1401 Shared protocol conversion server
1402 Cloud
1410 Protocol conversion reception unit
1438 Protocol conversion inquiry unit

The invention claimed is:

1. A home equipment management apparatus connected to a user terminal and a house control device in a user home corresponding to the user terminal via a wide area network, the home equipment management apparatus comprising:
an equipment management table in which, for standard-compatible equipment connected to a home network in the user home, address information in the home network and equipment information specifying the standard-compatible equipment including a vendor name are registered;
a processor; and
a memory device storing instructions that, when executed by the processor, configure the processor to:
inquire, in response to a registration request from the user terminal, the house control device that controls the standard-compatible equipment and a vendor-specific equipment connected to the home network about information of the vendor-specific equipment;
register, in the equipment management table, the information of the vendor-specific equipment including at least address information of the vendor-specific equipment transmitted from the house control device in response to the inquiry from the inquiry unit, together with identification information indicating that the equipment is vendor-specific equipment;
transmit the information of the vendor-specific equipment registered in the equipment management table to the user terminal to acquire a result of approval, correction, or addition by the user terminal; and
update a registered content of the vendor-specific equipment in the equipment management table according to the result of approval, correction, or addition by the user terminal.

2. The home equipment management apparatus according to claim 1,
wherein the address information includes a MAC address value of the equipment, and
the equipment information includes a model name, an equipment name, and a vendor name of the equipment.

3. The home equipment management apparatus according to claim 1,
wherein the information of the vendor-specific equipment transmitted from the house control device in response to the inquiry includes the address information of the vendor-specific equipment,
the processor is configured to:
register, in the equipment management table, the address information of the vendor-specific equipment together with the identification information indicating that the equipment is vendor-specific equipment,
transmit the address information of the vendor-specific equipment to the user terminal and acquire an addition result of the equipment information of the vendor-specific equipment by the user terminal, and
register the equipment information of the vendor-specific equipment in the equipment management table from the addition result by the user terminal.

4. The home equipment management apparatus according to claim 1, further comprising a conversion table in which a relationship between the control content included in the control request from the user terminal and a vendor-specific command for controlling the vendor-specific equipment is registered,
wherein the processor is further configured to:
receive, from the user terminal, a control request including equipment to be controlled in the user home and a control content of the equipment;
discriminate whether the equipment to be controlled included in the control request is the standard-compatible equipment or the vendor-specific equipment, with reference to the equipment management table; and
convert the control content included in the control request into the vendor-specific command with reference to the conversion table and transmits the vendor-specific command to the equipment to be controlled when determining that the equipment to be controlled is the vendor-specific equipment.

5. The home equipment management apparatus according to claim 1, wherein the processor is further configured to:
receive, from the user terminal, a control request including an equipment to be controlled in the user home and a control content of the equipment;
discriminate whether the equipment to be controlled included in the control request is the standard-compatible equipment or the vendor-specific equipment, with reference to the equipment management table; and
when determining that the equipment to be controlled is the vendor-specific equipment, transmit, to a conversion server that is configured to convert the control content into a vendor-specific command via the wide area network, the control content included in the control request from the user terminal and information indicating a vendor included in the equipment information registered in the equipment management table for the equipment to be controlled, convert the control content into the vendor-specific command upon receiving the command converted by the conversion server, and transmit the vendor-specific command to the equipment to be controlled.

6. The home equipment management apparatus according to claim 1,
wherein the information of the vendor-specific equipment transmitted from the house control device in response to the inquiry includes the address information and equipment information of the vendor-specific equipment,
wherein the processor is configured to:
register, in the equipment management table, the address information and the equipment information of the vendor-specific equipment together with the identification information indicating that the equipment is vendor-specific equipment,
transmit the address information and the equipment information of the vendor-specific equipment to the user terminal and acquires an approval result or a correction result of the equipment information by the user terminal, and
confirm, when acquiring the approval result by the user terminal, the equipment information registered for the vendor-specific equipment in the equipment management table, and correct, when acquiring the correction result by the user terminal, the equipment information registered for the vendor-specific equipment in the equipment management table by the correction result.

7. A non-transitory computer readable medium storing a program, wherein executing of the program causes processor to operate as the home equipment management apparatus according to claim 1.

8. A non-transitory computer readable medium storing a program, wherein executing of the program causes a processor to operate as the home equipment management apparatus according to claim 2.

9. A non-transitory computer readable medium storing a program, wherein executing of the program causes a processor to operate as the home equipment management apparatus according to claim 3.

10. A non-transitory computer readable medium storing a program, wherein executing of the program causes a processor to operate as the home equipment management apparatus according to claim 4.

11. A non-transitory computer readable medium storing a program, wherein executing of the program causes a processor to operate as the home equipment management apparatus according to claim 5.

12. A non-transitory computer readable medium storing a program, wherein executing of the program causes a processor to operate as the home equipment management apparatus according to claim 6.

13. A home control management method in a home equipment management apparatus including a processor and a storage and connected to a user terminal and a house control device in a user home corresponding to the user terminal via a wide area network, the method comprising:
by the processor, registering for standard-compatible equipment connected to a home network of the user home in an equipment management table provided in the storage, address information in the home network and equipment information specifying the standard-compatible equipment including a vendor name;
by the processor, inquiring, in response to a registration request from the user terminal, about information of the standard-compatible equipment and a vendor-specific equipment connected to the home network;
by the processor, registering, in the equipment management table, the information of the vendor-specific equipment including at least address value information of the vendor-specific equipment transmitted from the house control device in response to the inquiry, together with identification information indicating that the equipment is vendor-specific equipment;
by the processor, transmitting the information of the vendor-specific equipment registered in the equipment management table to the user terminal and acquiring a result of approval, correction, or addition by the user terminal; and by the processor, updating a registered content of the vendor-specific equipment in the equipment management table according to the result of approval, correction, or addition acquired by the user terminal.

\* \* \* \* \*